US010452666B2

(12) United States Patent
Ishii et al.

(10) Patent No.: US 10,452,666 B2
(45) Date of Patent: Oct. 22, 2019

(54) SENSOR DATA SEARCH SYSTEM, SENSOR DATA SEARCH METHOD AND MANAGEMENT COMPUTER

(71) Applicant: Hitachi, Ltd., Chiyoda-ku, Tokyo (JP)

(72) Inventors: Daisuke Ishii, Tokyo (JP); Yuji Ogata, Tokyo (JP); Yuji Tsushima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 15/660,089

(22) Filed: Jul. 26, 2017

(65) Prior Publication Data

US 2018/0067995 A1 Mar. 8, 2018

(30) Foreign Application Priority Data

Sep. 2, 2016 (JP) ................ 2016-171672

(51) Int. Cl.
*G06F 16/22* (2019.01)
*G06F 16/2458* (2019.01)
*G06F 16/27* (2019.01)
*H04L 12/26* (2006.01)
*H04L 12/66* (2006.01)
*H04L 12/751* (2013.01)
*H04L 29/08* (2006.01)

(52) U.S. Cl.
CPC ...... *G06F 16/2477* (2019.01); *G06F 16/2228* (2019.01); *G06F 16/27* (2019.01); *H04L 12/66* (2013.01); *H04L 43/106* (2013.01); *H04L 45/026* (2013.01); *H04L 67/12* (2013.01)

(58) Field of Classification Search
CPC .. G06F 16/2477; G06F 16/2228; G06F 16/27; H04L 45/026; H04L 43/106; H04L 12/66; H04L 67/12
See application file for complete search history.

(56) References Cited

U.S. PATENT DOCUMENTS

2002/0198679 A1 12/2002 Victor et al.
2008/0183417 A1* 7/2008 Lee ................... H04L 67/12
702/127

(Continued)

FOREIGN PATENT DOCUMENTS

JP 5-289921 A 11/1993
JP 5111719 B2 1/2013

*Primary Examiner* — Jorge A Casanova
(74) *Attorney, Agent, or Firm* — Crowell & Moring LLP

(57) ABSTRACT

In the sensor data retrieval system, a gateway connected to a plurality of sensor devices collects sensor data including measurement values and time stamps and stores them in a temporary storage part, and the management computer collects sensor data and stores sensor data in the first storage part, the management computer updates the collected time for each gateway as the first time, registers the sensor data of the first storage part in the second storage part in the registration cycle, the search part which updates the latest time stamp among the time stamps of the registered sensor data for each gateway with the second time as the second time and accepts the search period and searches for the sensor data of the time stamp included in the search period, and the search upper limit time from the search period, and compares the second time with the search upper limit time.

15 Claims, 21 Drawing Sheets

(56) References Cited

U.S. PATENT DOCUMENTS

| | | | |
|---|---|---|---|
| 2012/0197911 A1* | 8/2012 | Banka | H04L 67/12 |
| | | | 707/752 |
| 2013/0080114 A1* | 3/2013 | Stergiou | G05B 23/0221 |
| | | | 702/176 |
| 2013/0103657 A1* | 4/2013 | Ikawa | G06F 16/90344 |
| | | | 707/693 |
| 2014/0122022 A1* | 5/2014 | Chen | H04L 67/12 |
| | | | 702/181 |
| 2016/0371363 A1* | 12/2016 | Muro | G01D 9/28 |
| 2018/0082873 A1* | 3/2018 | Ohmori | G01D 1/00 |
| 2019/0042344 A1* | 2/2019 | Zhao | G06F 11/0721 |

* cited by examiner

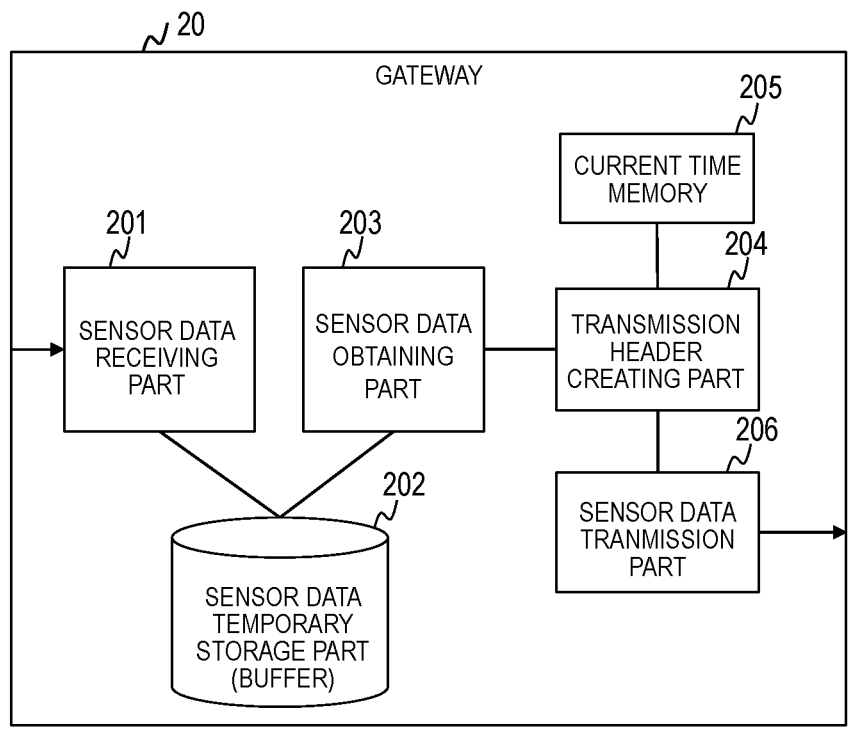
FIG. 3B
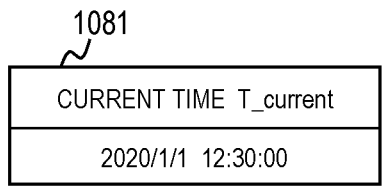
FIG. 3C
| ALERT RELATED SENSOR DEVICE INFORMATION TABLE ||| 1091 |
| --- | --- | --- |
| ALERT ORIGINATING DEVICE ID | RELATED DEVICE ID LIST | RELATED TIME PERIOD |
| A | B,C,D,E,G,H | 30 MINUTES |
|  |  |  |
| F41 | F42 | F43 |
FIG. 3D

1101

| ASSET INFORMATION TABLE | |
|---|---|
| DEVICE ID | CONNECTED GATEWAY ID |
| A | 1 |
| B | 1 |
| C | 1 |
| D | 2 |
| E | 2 |
| F | 2 |
| G | 3 |
| H | 3 |
| I | 3 |
| ⋮ | ⋮ |

| GATEWAY PACKET TRANSMISSION TIME TABLE | |
|---|---|
| TRANSMISSION GATEWAY ID | PACKET TRANMISSION TIME $T\_transmit$ |
| 1 | 2020/1/1 12:25:00 |
| 2 | 2020/1/1 12:10:00 |
| ⋮ | ⋮ |
| N | 2020/1/1 12:15:00 |

| MOST RECENT TIME TABLE ||
|---|---|
| GATEWAY ID | MOST RECENT TIME T_recent |
| 1 | 2020/1/1 11:55:00 |
| 2 | 2020/1/1 11:50:00 |
| ⋮ | ⋮ |
| N | 2020/1/1 11:45:00 |

| SENSOR DATA INFORMATION TABLE ||||
|---|---|---|---|
| TIME STAMP | DEVICE ID | ITEM | MEASURED VALUE |
| 2020/1/1 11:55:00 | B | TEMPERATURE | 28°C |
| 2020/1/1 11:50:00 | E | TEMPERATURE | 24°C |
| 2020/1/1 11:45:00 | G | VIBRATION VALUE | 10dB |
| 2020/1/1 11:42:30 | A | ALERT | FAULT |
| 2020/1/1 11:40:00 | C | TEMPERATURE | 29°C |
| ⋮ | ⋮ | ⋮ | ⋮ |

SENSOR DATA SEARCH SYSTEM, SENSOR DATA SEARCH METHOD AND MANAGEMENT COMPUTER

CLAIM OF PRIORITY

The present application claims priority from Japanese patent application JP 2016-171672 filed on Sep. 2, 2016, the content of which is hereby incorporated by reference into this application.

BACKGROUND

The present invention relates to a computer system that collects and searches for sensor data.

The main purpose of a conventional sensor data search system is to find necessary data from long-term data (data collected one day to several months before) accumulated throughout one day or one month to perform a business process or analysis on that data. However, as IoT (Internet of Things) is more widely used, more and more businesses find valuable a service that provides an added value by analyzing short-term data collected more recently (less than a minute to several minutes ago) and performing a feedback process in a shorter cycle, and there is a strong demand for a technique that can rapidly find and process short-term data.

In the conventional sensor data search system, a gateway that collects sensor data from a sensor device temporarily accumulates data transmitted from the sensor device, and the accumulated sensor data is sent to a sensor data management apparatus that stores the sensor data at a certain time interval, thereby suppressing an increase in overhead due to the header addition.

The sensor data management apparatus stores a certain amount of data received from the gateway in a buffer, and registers the data in database in bulk, thereby reducing the registration processing time for the database.

Thus, the sensor data collected recently is saved in not the database of the sensor data management apparatus, but the buffer of the sensor data management apparatus or the gateway, and therefore, it is necessary to perform a search process on not only the database, but also a plurality of storage devices including the buffer of the sensor data management apparatus and the gateway.

SUMMARY

An object of the present invention is to reduce the time required to find the sensor data recently collected.

Japanese Patent Application Laid-open Publication No. H5-289921 discloses a known example in which a search process is performed on not only the database, but also the data that has not been registered (committed) in the database.

Japanese Patent No. 5111719 discloses, as a known example, a means to output data that combines a plurality of search results performed on a plurality of databases.

When those known examples are applied, whether the long-term data or the short-term data is to be searched, a search process needs to be performed on all of the storage devices. Thus, when the short-term data is to be analyzed in real-time in an order of several hundreds ms to several seconds, the search time of the short-term data would be too long to achieve a desired analysis time.

A representative aspect of the present disclosure is as follows. A sensor data search system for searching sensor data, comprising: a gateway connected to a plurality of sensor devices; and a management computer including a processor and a memory, the management computer being connected to a plurality of the gateways, wherein the gateway is configured to collect sensor data from the sensor devices and store the sensor data in a temporary storage part, the sensor data including a measurement value, a time stamp, and an identifier, wherein the management computer includes: a receiving part configured to collect the sensor data of each gateway, store the sensor data in a first storage part, and update a first time, which is a time at which the sensor data was collected, for each gateway; a data committing part configured to register the sensor data of the first storage part into a second storage part at a prescribed time interval of registration cycle, compare time stamps of the registered sensor data among the respective gateways, and update a second time to a value of the latest time stamp for each gateway; and a search part configured to receive a search period, and search for sensor data including time stamps within the search period, and wherein the search part calculates a search upper limit time based on the current time and the search period, and compares the second time with the search upper limit time.

According to the present invention, it is possible to limit storage parts to be searched based on the most recent time stamp and the search period of the sensor data registered in a database of the sensor data management apparatus, and if the search period is short, the search scope of the sensor data can be made smaller, which makes it possible to speed up the search process.

The problems, configurations, and effects other than those described above will be apparent by the descriptions of embodiments below.

BRIEF DESCRIPTION OF THE DRAWINGS

FIG. 3B is a block diagram showing an example of the gateway according to the embodiment of present invention.

FIG. 3C is a diagram showing an example of the current time table according to the embodiment of present invention.

FIG. 3D is a diagram showing an example of the alert related sensor device information table according to the embodiment of present invention.

FIG. 3E is a diagram showing an example of the asset information table according to the embodiment of present invention.

FIG. 3F is a diagram showing an example of the gateway packet transmission time table according to the embodiment of present invention.

FIG. 3G is a diagram showing an example of the most recent time table according to the embodiment of present invention.

FIG. 3H is a diagram showing an example of the sensor data information table

DETAILED DESCRIPTION OF THE PREFERRED EMBODIMENTS

Below, embodiments of a sensor data search system of the present invention will be explained with reference to appended figures.

<System Configuration Diagram>

Figure 1:
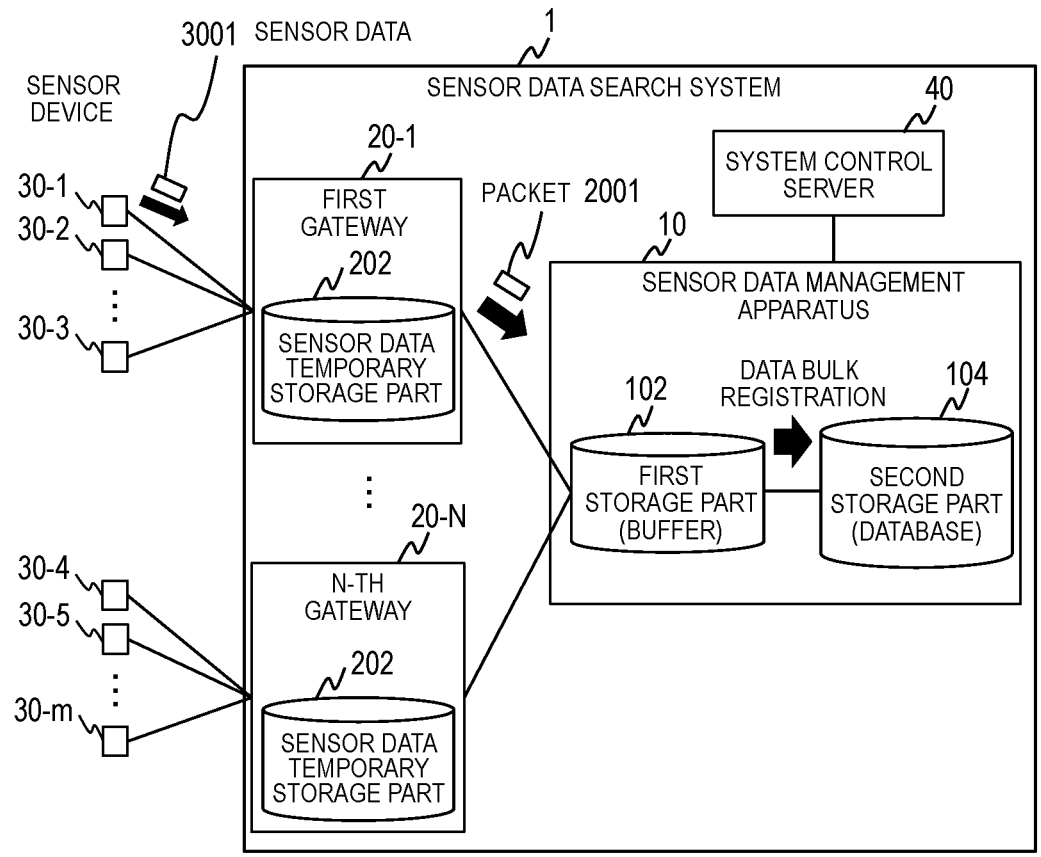
FIG. 1 is a block diagram showing an example of the configuration of a sensor data search system according to an embodiment of present invention.

FIG. 1 is a block diagram showing an example of the configuration of a sensor data search system of the present invention. The sensor data search system 1 includes a sensor data management apparatus 10, a plurality of gateways 20-1 to 20-N, and a system management server 40, and collects sensor data 3001 from a plurality of sensor devices 30-1 to 30-*m*. In the descriptions below, the constituting elements are collectively denoted with a reference character without a suffix, and when an individual element needs to be identified, a suffix is added to the reference character with a hyphen.

The sensor device 30 is a sensing device such as a temperature sensor, humidity sensor, and vibration sensor, and sends out a measured value, as sensor data 3001, to the network at a certain time interval. The sensor device 30 has the clock function indicating the current time, and adds the measured time to the sensor data 3001. The sensor device 30 also has the function of sending an alert that notifies an abnormal condition (or signs of abnormality). The abnormal condition is a state where the measured value of the sensor device 30 and the like meet prescribed conditions. The alert can be notified to the sensor data management apparatus 10 by including a certain message in the sensor data 3001.

The gateway 20 receives the sensor data 3001 from the sensor device 30, temporarily stores the sensor data in a sensor data temporary storage part 202, combines a plurality of pieces of sensor data 3001 stored in the sensor data temporary storage part 202 into a packet 2001 at a certain time interval, and sends the packet 2001 to the sensor data management apparatus 10.

The sensor data management apparatus 10 receives the packet 2001 from the gateway 20, and retrieves the plurality of pieces of sensor data 3001 from the payload of the packet 2001. The sensor data management apparatus 10 stores the sensor data 3001 in a first storage part 102, which functions as a buffer, for a prescribed period of time, and registers a plurality of pieces of sensor data 3001 stored in the first storage part 102 into a second storage part 104, which functions as a database, at a certain time interval.

The system management server 40 is a server that provides an administrator of the sensor data search system 1 with a screen interface to search for the sensor data 3001 collected by the sensor data search system 1, a screen interface to configure the sensor data search system 1, and the like.

The sensor data 3001 sent from the sensor device 30 is stored in one of the sensor data temporary storage part 202 of the gateway 20, the first storage part 102 of the sensor data management apparatus 10, and the second storage part 104 of the sensor data management apparatus 10, and the storage location changes as time goes by.

Figure 2:
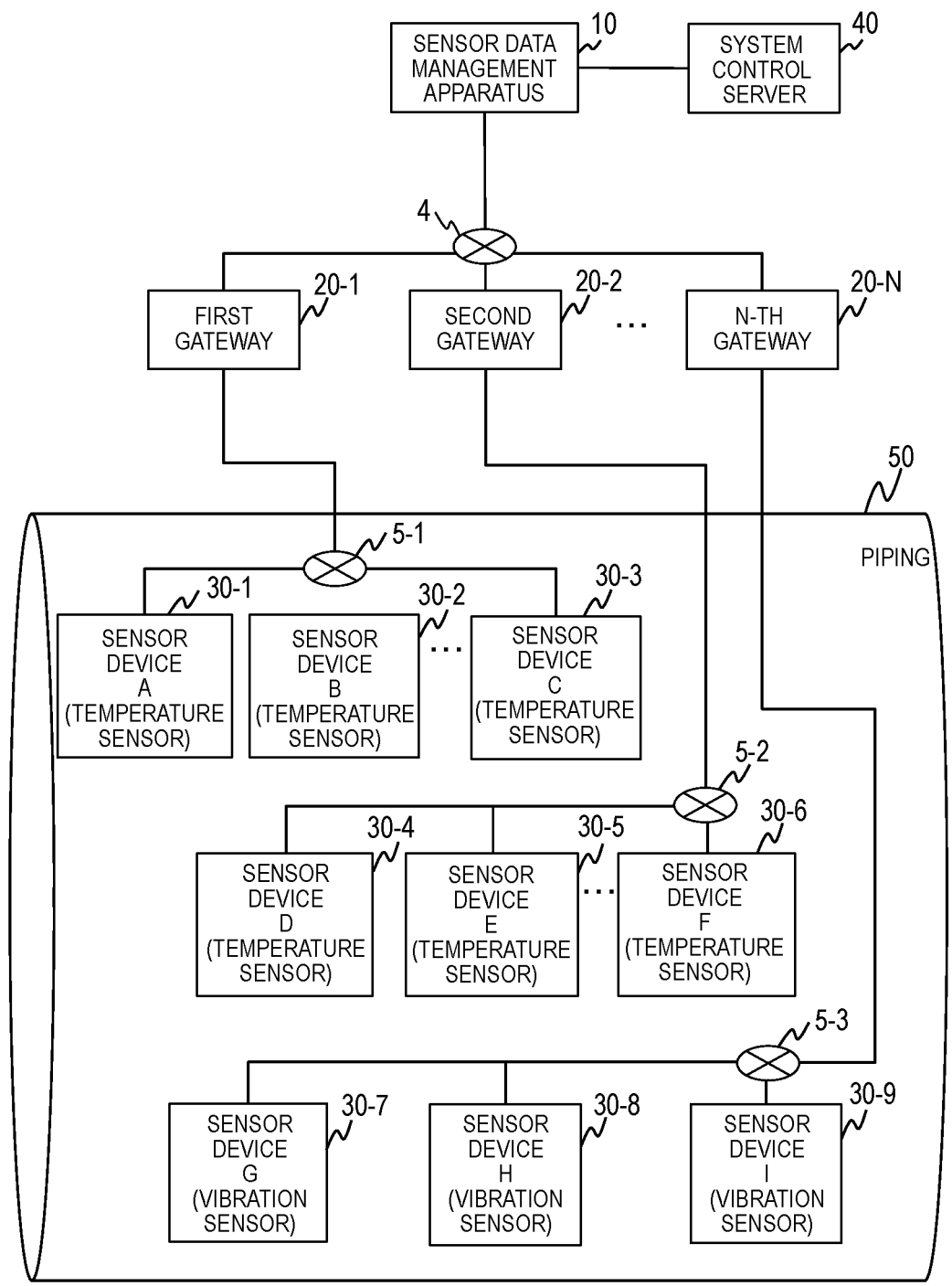
FIG. 2 is a block diagram showing a specific example of the sensor data search system according to the embodiment of present invention.

FIG. 2 is a block diagram showing a specific example of the sensor data search system 1 of the present invention. FIG. 2 shows an example of the sensor data search system 1 that manages piping in a site like a factory as a specific example.

Temperature sensors 30-1 to 30-3, humidity sensors 30-4 to 30-6, and vibration sensors 30-7 to 30-9 are installed on piping 50, and an administrator detects abnormality of the pipe based on the measured values of temperature, humidity, and vibration (acceleration).

The respective sensors 30 are connected to different gateway devices 20-1 to 20-N, and in the example of FIG. 2, the temperature sensors 30-1 to 30-3 are connected to the first gateway 20-1, the humidity sensors 30-4 to 30-6 are connected to the second gateway 20-2, and the vibration sensors 30-7 to 30-9 are connected to the N-th gateway 20-N.

The sensor data management apparatus 10 and the respective gateways 20 are connected to each other via a network 4, and the respective gateways 20 and the sensor devices 30 are connected to each other via networks 5-1 to 5-3, respectively. The system management server 40 may also be connected to the network 4.

Figure 3A:
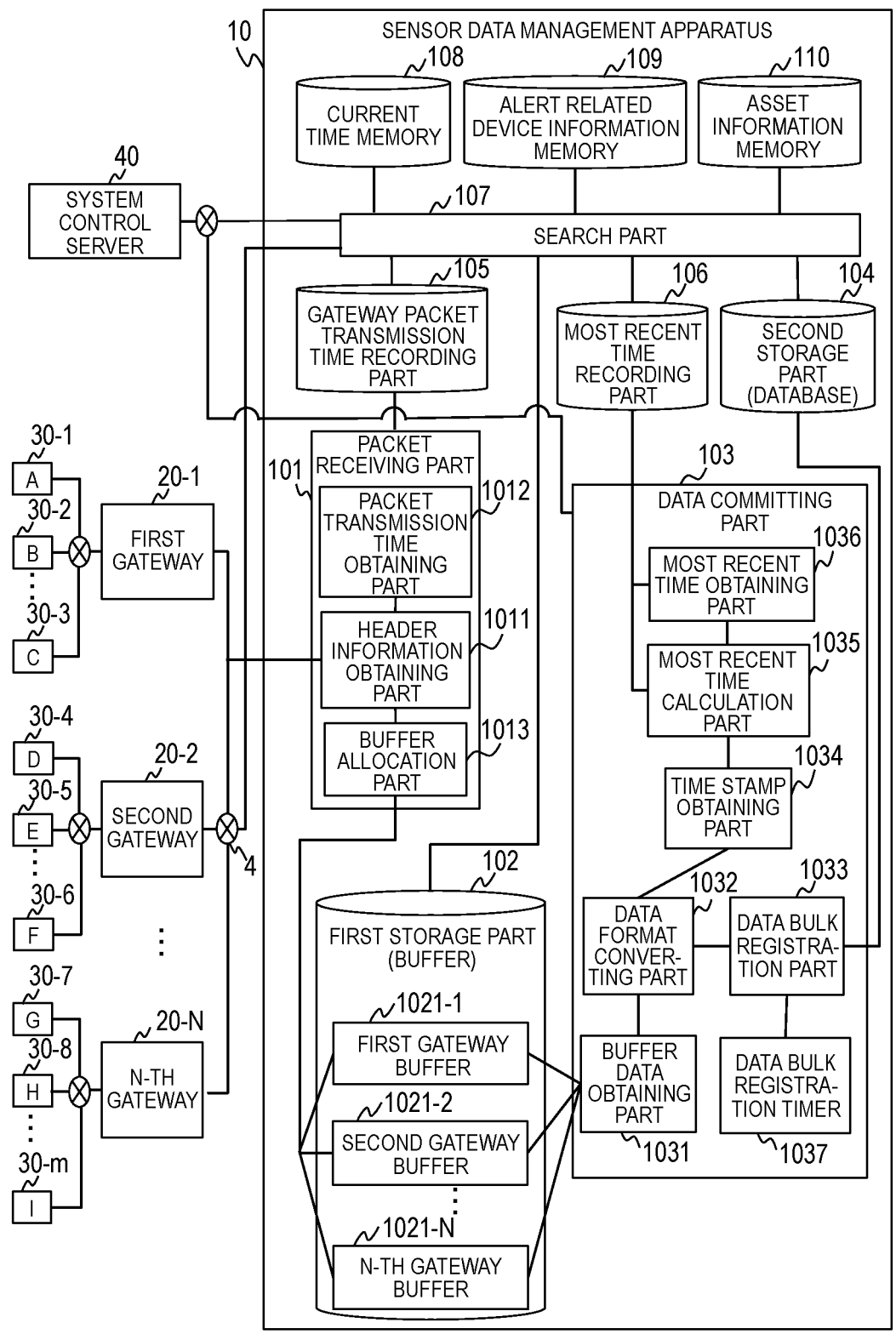
FIG. 3A is a block diagram showing an example of the configuration of the sensor data management apparatus according to the embodiment of present invention.

FIG. 3A is a block diagram showing an example of the configuration of the sensor data management apparatus 10 of the present invention. The sensor data management apparatus 10 includes a packet receiving part 101, a first storage part 102, which is a buffer, a data committing part 103, a second storage part 104, which is a database, a gateway packet transmission time recording part 105 configured to record the time at which a packet was sent from a gateway, a most recent time recording part 106, a search part 107, a current time memory 108, an alert related sensor device information memory 109, and an asset information memory 110.

The packet receiving part 101 has the function of receiving a packet 2001 sent from the gateway 20, and includes a header information obtaining part 1011 that reads out header information of the received packet 2001, a gateway packet transmission time obtaining part 1012 that obtains the time at which the gateway 20 sent the packet 2001 from the header information and that records the time in the packet transmission time recording part 105 for the gateway 20, and a buffer allocation part 1013 that stores a plurality of pieces of sensor data 3001 obtained from the payload of the received packet 2001.

The first storage part 102 is a buffer to temporarily store the plurality of pieces of sensor data 3001 stored in the payload of the received packet 2001. The first storage part 102 includes N-number of buffers 1021-1 to 1021-N, N being the number of connected gateways 20. For example, the sensor data 3001 included in the payload of the packet 2001 received from the first gateway 20-1 is stored in the first gateway buffer 1021-1.

The data committing part 103 has the function of registering all of the plurality of pieces of sensor data 3001 stored in the first storage part 102 in the second storage part 104, which is the database, and includes a buffer data obtaining part 1031 that obtains the sensor data 3001 from the first storage part 102, a data format converting part 1032 that converts the sensor data 3001 to the format necessary for the data to be registered in the database, a data bulk registration part 1033 that registers a plurality of pieces of sensor data 3001 together in the second storage part 104, which is the database, a time stamp obtaining part management computer that obtains the time stamp of the sensor data 3001, a most recent time calculation part management computer that calculates the most recent time that indicates the most recent time stamp among the sensor data 3001 registered in the second storage part 104, a most recent time obtaining part 1036 that reads out the most recent time recorded in the most recent time recording part 106, and a data bulk registration timer 1037 that determines the time at which the data bulk registration is performed.

The second storage part 104 is the database for storing the sensor data 3001, and has a sensor data information table 1041 (see FIG. 3H). In FIG. 3H, the sensor data information table 1041 has several fields such as a time stamp F11 indicating the time at which the sensor data 3001 was measured, a sensor device ID (F12) that stores an identifier of the sensor device 30, an item F13 indicating the measurement item such as a temperature and humidity, and a measured value F14.

The gateway packet transmission time recording part 105 is a function part that holds the transmission time T_transmit of the last packet sent by the gateway 20, and has a gateway packet transmission time table 1051 (see FIG. 3F). In FIG. 3F, the gateway packet transmission time table 1051 has, as the fields thereof, a gateway ID (F21) and a packet transmission time T-transmit (F22), and stores the information of the packet transmission time for each gateway 20.

The most recent time recording part 106 is a function part that stores the most recent time indicating the latest time stamp among the sensor data 3001 registered in the second storage part 104, and has a most recent time table 1061 (see FIG. 3G). In FIG. 3G, the most recent time table 1061 has, as the fields thereof, a gateway ID (F31) and a most recent time T_recent (F32), and stores information of the most recent time for each gateway 20.

The search part 107 has the function of searching for the sensor data 3001. The administrator of the sensor data search system 1 enters the search conditions of the sensor data 3001 through the input function of the system management server 40, thereby causing the search part 107 to search for the sensor data 3001.

The current time memory 108 has the clock function of storing the current time T_current 1081 (see FIG. 3C).

The alert related sensor device information storage part 109 stores information of the sensor data 3001 that needs to be referred to when the sensor device 30 issues an alert, in order to analyze the situation indicated by the alert, and has an alert related sensor device information table (alert related information) 1091 (see FIG. 3D).

In FIG. 3D, the alert related sensor device information table 1091 is a table indicating the sensor device IDs related to the sensor device 30 that has issued the alert, and the search target time period of the sensor data 3001 necessary to analyze the alert.

In FIG. 3D, the alert related sensor device information table 1091 has, as the fields thereof, an alert originating device ID (F41) indicating the sensor device ID that has issued the alert, a related sensor device ID list F42 indicating IDs of sensor devices that transmits the sensor data related to the alert of the alert originating sensor device 30, and a related time range F43 indicating the target time period of the sensor data 3001 to be searched for, which is necessary for analyzing the alert of the sensor device A.

The administrator of the sensor data search system 1 determines information to be stored in the alert related sensor device information table 1091 in advance, and enters the determined information in the alert related sensor device information table 1091 through the input function of the system management server 40.

The asset information storage part 110 is a function part that stores the information of the gateway 20 connected to each sensor device 30, and has an asset information table 1101 (see FIG. 3E). In FIG. 3E, the asset information table 1101 has, as the fields thereof, a device ID (F51) and a connected gateway ID (F52) indicating the gateway ID connected to the sensor device 30.

FIG. 3B is a block diagram showing an example of the gateway 20. The gateways 20-1 to 20-3 have a configuration similar to that of FIG. 3B. The gateway 20 has a sensor data receiving part 201, a sensor data temporary storage part 202, a sensor data obtaining part 203, a transmission header creating part 204, a current time memory 205, and a sensor data transmission part 206.

The sensor data receiving part 201 includes the function of receiving the sensor data 3001 sent from the sensor device 30 through the network 5, and storing the sensor data 3001 in the sensor data temporary storage part 202.

The sensor data temporary storage part 202 is a buffer that temporarily stores the sensor data 3001. The sensor data obtaining part 203 stores the accumulated plurality of pieces of sensor data 3001 as the payload of the packet 2001.

The transmission header creating part 204 generates a transmission header of the packet 2001. The gateway ID and the packet transmission time are included in the transmission header. The current time memory 205 has the clock function of keeping the current time, and the transmission header creating part 204 includes the time indicated by the current time memory 205 in the transmission header as the packet transmission time.

The sensor data transmission part 206 sends the generated packet 2001 through the network 4 to the sensor data management apparatus 10.

<Explanation of Time Managed by Sensor Data Management Apparatus>

In order to narrow down the scope of the storage parts to be searched for (sensor data temporary storage part 202 of the gateway 20, the first storage part 102, and the second storage part 104), the sensor data management apparatus 10 keeps three kinds of time, which are the current time T_current, the packet transmission time T_transmit indicating the time at which the last packet was sent by the gateway 20, and the most recent time T_recent indicating the latest time stamp among the sensor data 3001 registered in the second storage part 104. The packet transmission time T_transmit and the most recent time T_recent are kept separately for each gateway 20.

<Hardware Configuration Diagram>

Figure 4:
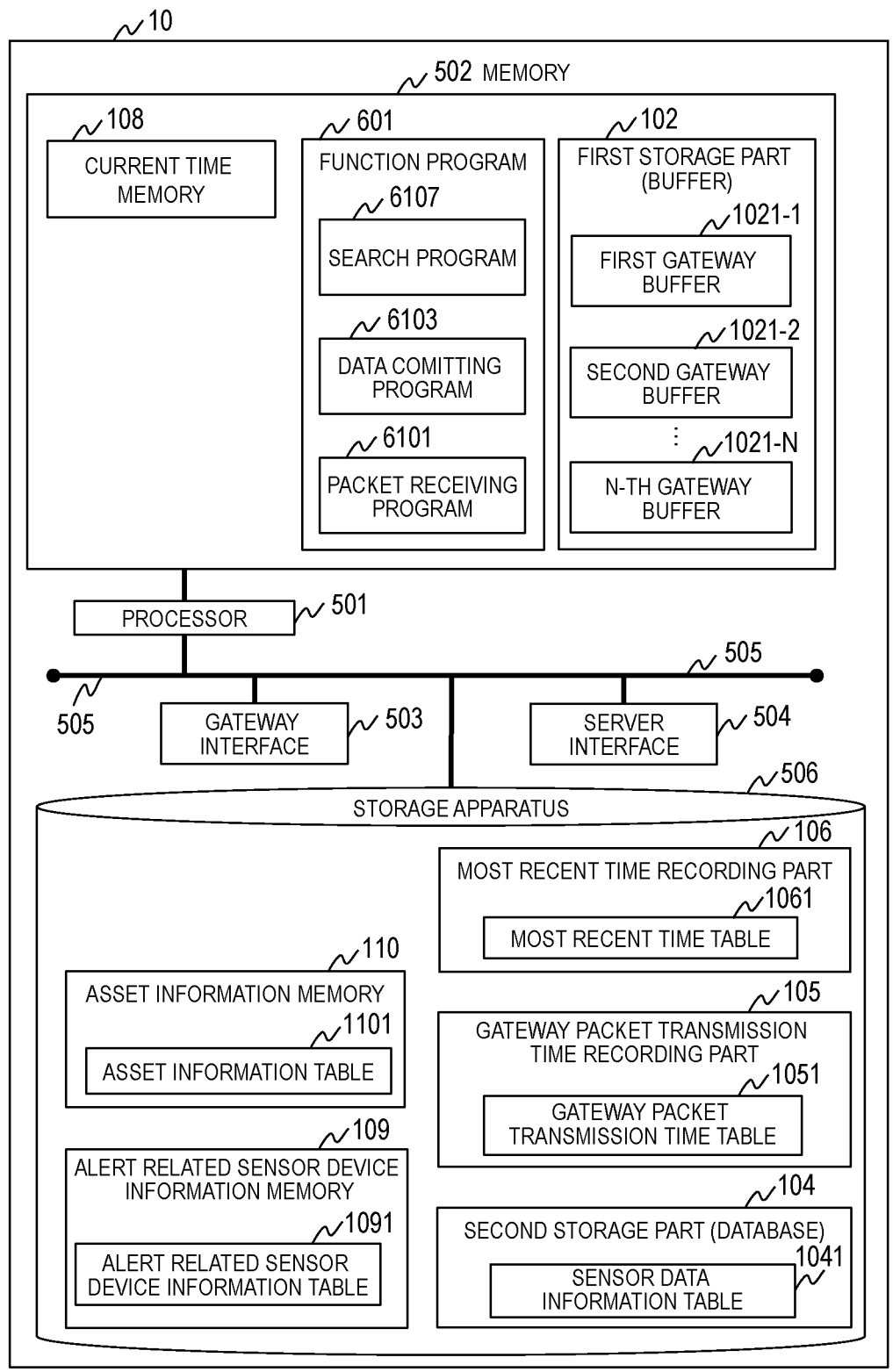
FIG. 4 is a block diagram showing an example of the configuration of the sensor data management apparatus according to the embodiment of present invention.

FIG. 4 is a block diagram showing an example of the configuration of the sensor data management apparatus 10 of the present invention. The sensor data management apparatus 10 includes a processor 501, a memory 502, a storage device 506, a gateway interface 503, a server interface 504, and a bus 505. The processor 501, the memory 502, the storage device 506, the gateway interface 503, and the server interface 504 are connected via the bus 505.

The processor 501 performs processes corresponding to the function program 601 loaded to the memory 502. The function program 601 includes a packet receiving program 6101 executing the processes of the packet receiving part 101, a data committing program 6103 executing the processes of the data committing part 103, and a search program 6107 executing the processes of the search part 107.

The memory 502 includes the first storage part 102 is comprised of a plurality of gateway buffers 1021-1 to 1021-N. The current time memory 108 is loaded to the memory 502, thereby allowing the processor 501 to have the clock function of keeping the current time T_current 1081 (see FIG. 3C).

The respective function parts of the packet receiving part 101, the data committing part 103, and the search part 107 shown in FIG. 3A are loaded to the memory 502 as the search program 6107.

The processor 501 operates in accordance with a program of each function part, thereby operating as a function part that realizes a prescribed function. For example, the processor 501 functions as the search part 107 by performing the processes in accordance with the search program 6107. The same applies to other programs. The processor 501 also operates as a function part that realizes each function of a plurality of processes conducted by respective programs. The computer and computing system are a device and system that include those function parts.

Information for realizing the respective functions of the function program 601 such as programs and tables can be stored in the storage device 506, a memory device such as a non-volatile semiconductor memory, hard disk drive, or SSD (solid state drive), or a computer readable non-temporary data storage medium such an IC card, SD card, or DVD.

The storage device 506 stores therein data to be referred to when the function program 601 is executed. The storage device 506 includes the second storage part 104 comprising the sensor data information table 1041, the gateway packet transmission time recording part 105 that has the gateway packet transmission time table 1051, the most recent time recording part 106 comprising the most recent time table 1061, the alert related sensor device information memory 109 comprising the alert related sensor device information table 1091, and the asset information memory 110 comprising the asset information table 1101.

The gateway interface 503 inputs and outputs communication data to and from the gateway 20. The server interface 504 inputs and outputs communication data to and from the system management server 40.

In the example of the figure, the gateway buffer 1021 was disposed on the memory 502, but the gateway buffer 1021 may alternatively be disposed on the storage device 506.

Figure 5:
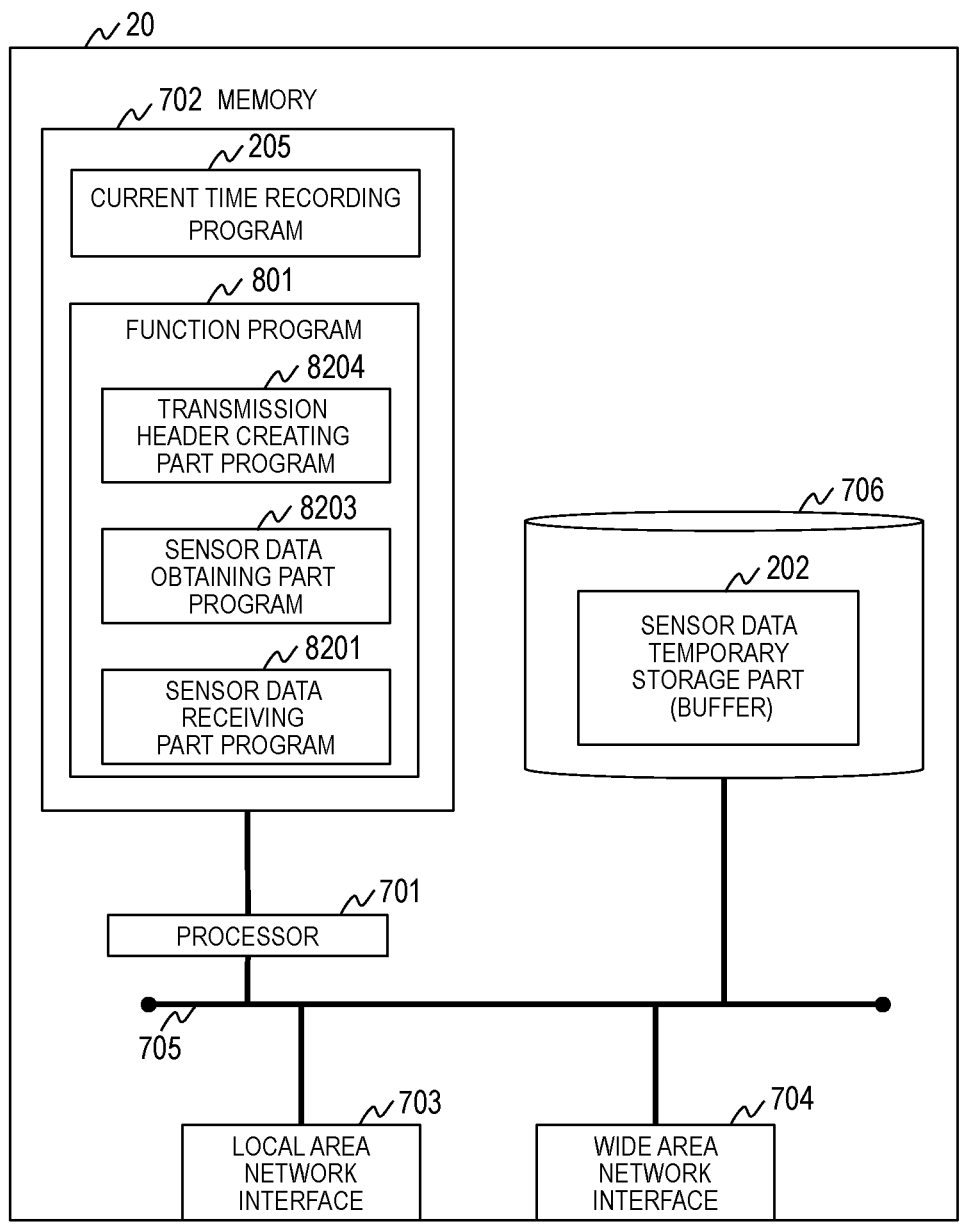
FIG. 5 is a block diagram showing an example of the hardware configuration of the gateway according to the embodiment of present invention.

FIG. 5 is a block diagram showing an example of the hardware configuration of the gateway 20 of the present invention. The gateway 20 includes a processor 701, a memory 702, a local area network interface 703, and a wide area network interface 704, and a bus 705. The processor 701, the memory 702, the local area network interface 703, the wide area network interface 704, and the storage device 706 are connected via the bus 705.

The processor 701 performs processes corresponding to a function program 801. The function program 801 includes a sensor data receiving part program 8201 executing the processes of the sensor data receiving part 201, a sensor data obtaining part program 8203 executing the processes of the sensor data obtaining part 203, and a transmission header creating part program 8204 executing the processes of the transmission header creating part 204.

The respective function parts of the sensor data receiving part 201, the sensor data obtaining part 203, and the transmission header creating part 204 shown in FIG. 3B are loaded to the memory 702 as the sensor data receiving part program 8201, the sensor data obtaining part program 8203, and the transmission header creating part program 8204.

The processor 701 operates in accordance with a program of each function part, thereby operating as a function part that realizes a prescribed function. For example, the processor 701 functions as the sensor data receiving part 201 by performing the processes in accordance with the sensor data receiving part program 8201. The same applies to other programs. The processor 701 also operates as a function part that realizes each function of a plurality of processes conducted by respective programs. The computer and computing system are a device and system that include those function parts.

Information for realizing the respective functions of the function program 801 such as programs and tables can be stored in the storage device 706, a memory device such as a non-volatile semiconductor memory, hard disk drive, or SSD (solid state drive), or a computer readable non-temporary data storage medium such an IC card, SD card, or DVD.

The storage device 706 stores therein data to be referred to when the function program 801 is executed. The storage device 706 includes the sensor data temporary storage part 202 that functions as a buffer.

The sensor device 30 is connected to the local area network interface 703, and the sensor data management apparatus 10 is connected to the wide area network interface 704 via the network 4.

<Sensor Data Collection Process>

Figure 6:
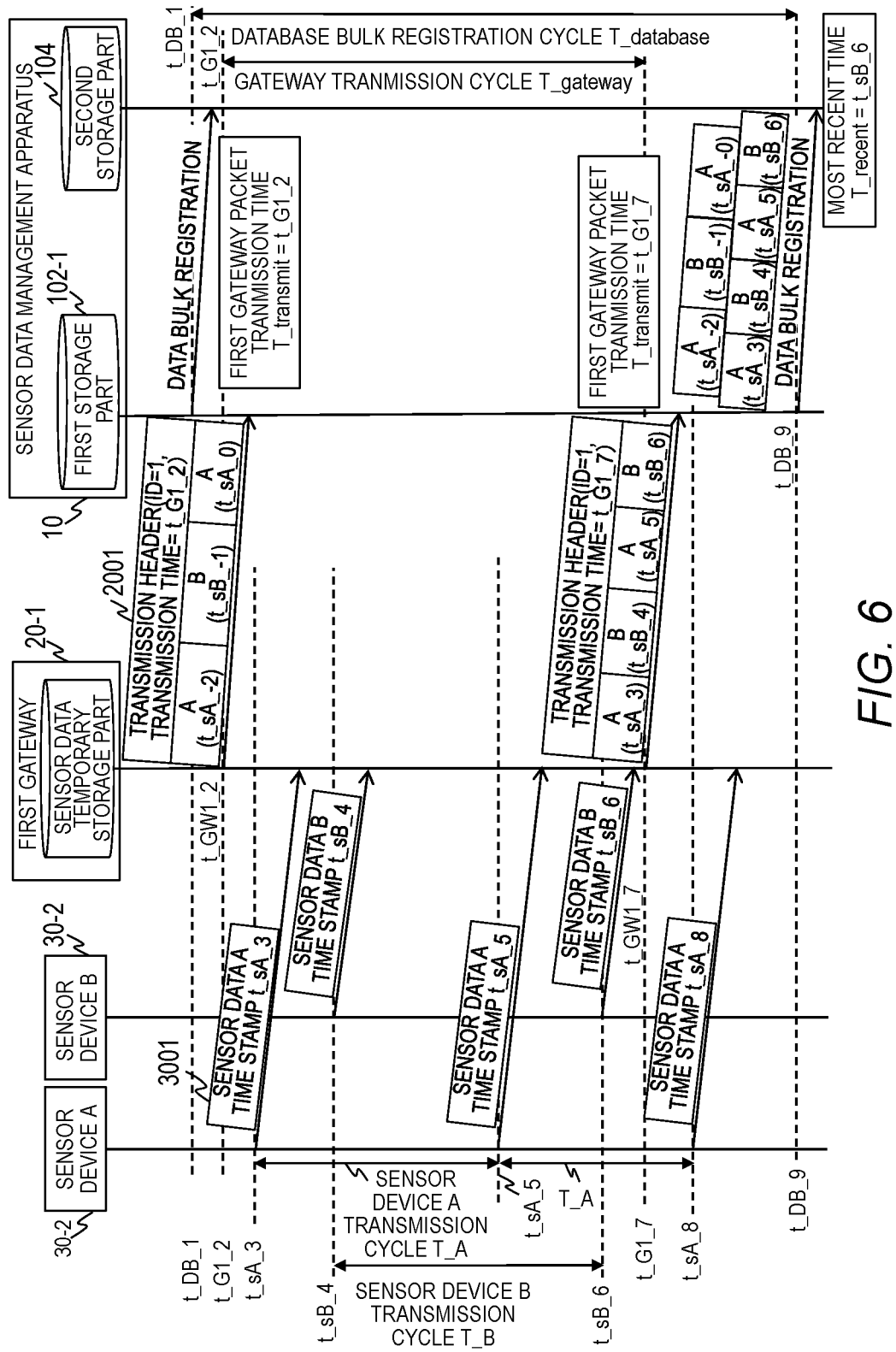
FIG. 6 shows a time chart showing an example of the sensor data collection in the sensor data search system according to the embodiment of present invention.

FIG. 6 shows a time chart showing an example of the sensor data collection in the sensor data search system 1 of the present invention. FIG. 6 shows an example in which the sensor data management apparatus 10 collects the sensor data 3001 from the sensor device A30-1 and the sensor device B30-2 connected to the first gateway 20-1.

In FIG. 6, t_sA_n (n is a variable number) indicates the time at which the sensor device A30-1 sends the sensor data 3001, and t_sB_n (n is a variable number) indicates the time at which the sensor device B30-1 sends the sensor data 3001.

t_G1_n (n is a variable number) indicates the time at which the first gateway 20-1 sends the sensor data 3001, which was received from the sensor device 30-1 and the sensor device 30-2, to the sensor data management apparatus 10.

t_DB_n (n is a variable number) indicates the time at which the sensor data management apparatus 10 registers the sensor data 3001 accumulated in the first storage part 102 all together in the second storage part 104. The value "n" is given to t_sA_n, t_sB_n, t_G1_n, and t_DB_n in series, and the greater the value "n" is, the closer it is to the current time.

The flow of the sensor data collection in the example of FIG. 6 will be explained. The sensor device A30-1 and the sensor device B30-2 respectively send the sensor data 3001 to the first gateway 20-1 in respective transmission cycles T_A and T_B. The sensor data 3001 includes a sensor device ID, a time stamp indicating the transmission time t_sA_n or t_sB_n of the sensor data 3001, and measured values of the sensor device.

The first gateway 20-1 stores a plurality of pieces of sensor data 3001, which are accumulated in the sensor data temporary storage part 202, in the payload of the packet 2001, and sends the data to the sensor data management apparatus 10 in a gateway transmission cycle T_gateway. In the header of the packet 2001, the gateway ID and the transmission time t_G1_n are included.

The sensor data management apparatus 10 receives the packet 2001 from the first gateway 20-1, obtains the transmission time t_G1_n from the header of the packet 2001, and stores the transmission time as the packet transmission time T_transmit of the first gateway 20-1. The sensor data management apparatus 10 also obtains a plurality of pieces of sensor data 3001 from the payload of the packet 2001, and stores the data in the first gateway buffer 1021-1 in the first storage part 102.

The sensor data management apparatus 10 registers the plurality of pieces of sensor data 3001 accumulated in the first gateway buffer 1021-1 of the first storage part 102 all together in the second storage part 104 at a time interval of database bulk registration cycle T_database. In this bulk registration process, the sensor data management apparatus 10 keeps, as the most recent time T_recent, the latest time stamp among the time stamps of the sensor data 3001 subjected to the bulk registration process.

For example, in FIG. 6, four pieces of sensor data 3001, which were sent from the sensor device A30-1, and three pieces of sensor data 3001, which were sent from the sensor device B30-2, are registered at the time t_DB_9. In this process, the latest time stamp is t_sB_6, and therefore, the sensor data management apparatus 10 keeps t_sB_6 as the most recent time T_recent.

In the example of FIG. 6, at the time of t_DB_9, the sensor data 3001 that had been sent from the sensor device 30 before t_DB_6 is stored in the second storage part 104. The sensor data 3001 that had been sent from the sensor device after t_sB_6 and before t_G1_7 is stored in the first storage part 102. The sensor data 3001 sent by the sensor device 30 after the time t_G1_7 is stored in the sensor data temporary storage part 202 of the first gateway 20-1.

FIG. 6 shows the example of the "push" type where the packet 2001 is sent by the first gateway 20-1 in a certain gateway transmission cycle, but the "pull" type may alternatively employed where the sensor data management apparatus 10 sends a sensor data obtaining request to the first gateway 20-1 at a certain time interval, and obtains information equivalent to the packet 2001.

The transmission cycle T_A of the sensor device A30-1, the transmission cycle T_B of the sensor device B30-2, the gateway transmission cycle T_gateway, and the database bulk registration cycle T_database do not have to be the same value, and may vary every time.

The example of the "push" type where the sensor data 3001 is sent by the sensor device 30 in a certain cycle T_A was shown, but the "pull" type may alternatively be employed where the gateway 20 sends a sensor data obtaining request to the sensor device 30 at a certain time interval, and obtains information equivalent to the sensor data 3001.

<Process of Sending Sensor Data to Sensor Data Management Apparatus from Gateway>

Figure 7:
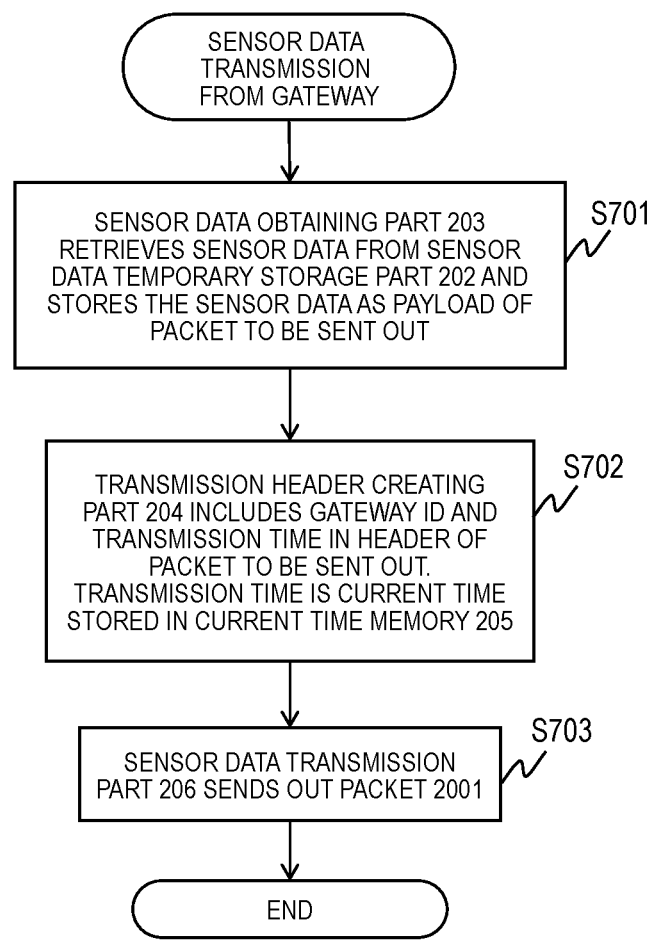
FIG. 7 is a flowchart showing an example of the process to send the sensor data to the sensor data management apparatus from the gateway according to the embodiment of present invention.

FIG. 7 is a flowchart showing an example of the process to send the sensor data to the sensor data management apparatus 10 from the gateway 20. This process is conducted at a time interval of gateway transmission cycle T_gateway shown in FIG. 6.

The sensor data obtaining part 203 of the gateway 20 obtains one or more pieces of sensor data 3001 from the sensor data temporary storage part 202, and stores the data as the payload of a packet 2001 to be sent (Step S701).

Next, the transmission header creating part 204 of the gateway 20 includes the gateway ID and the transmission time in the header of the packet to be sent. The current time stored in the current time memory 205 is included as the transmission time (Step S702).

Lastly, the sensor data transmission part 206 of the gateway 20 sends out the packet 2001.

Through the process described above, the packet 2001 is sent from the gateway 20 to the sensor data management apparatus 10 at a time interval of gateway transmission cycle T_gateway.

<Process of Receiving Sensor Data by Sensor Data Management Apparatus>

Figure 8:
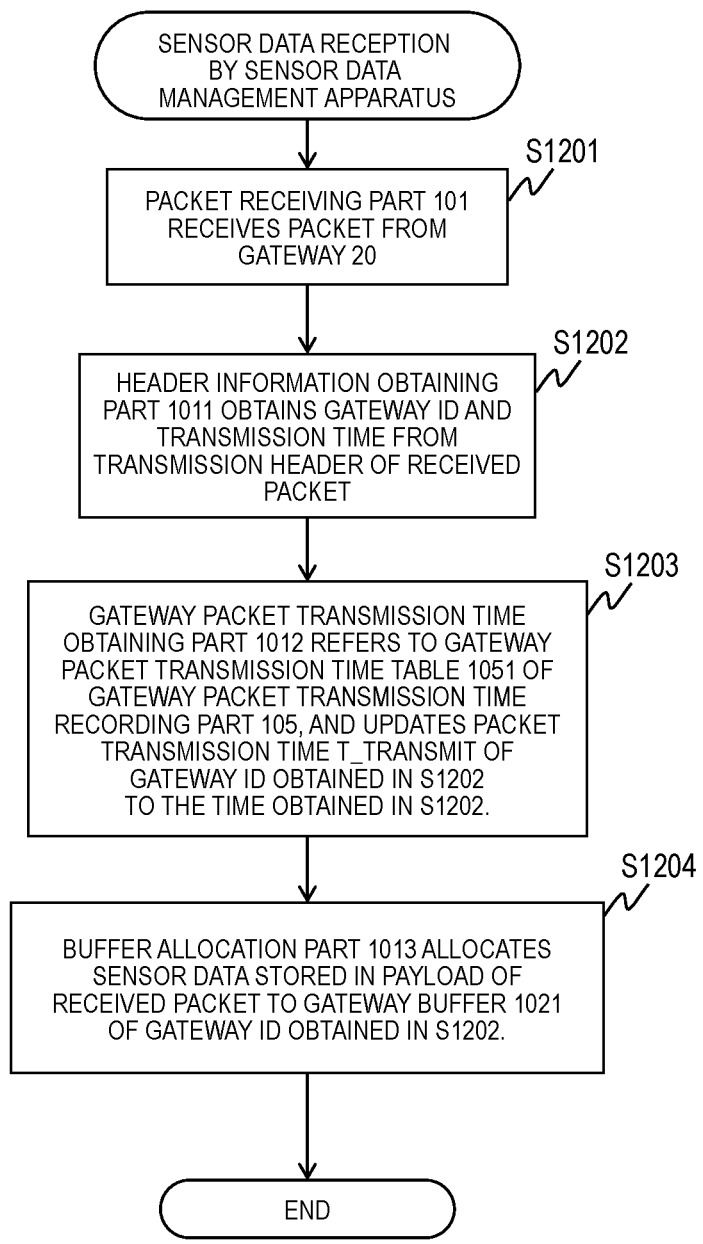
FIG. 8 is a flowchart showing an example of the process of the sensor data management apparatus according to the embodiment of present invention.

FIG. 8 is a flowchart showing an example of the process of the sensor data management apparatus 10 to receive the packet 2001 including the sensor data sent by the gateway 20. This process is conducted every time after receiving the packet 2001 from the gateway 20.

The packet receiving part 101 of the sensor data management apparatus 10 receives the packet 2001 from the gateway 20 (Step S1201).

The header information obtaining part 1011 of the sensor data management apparatus 10 obtains the gateway ID and the transmission time from the transmission header of the received packet 2001 (Step S1202).

The gateway packet transmission time obtaining part 1012 of the sensor data management apparatus 10 refers to the gateway packet transmission time table 1051 stored in the gateway packet transmission time recording part 105, and updates the packet transmission time T_transmit (F22) of the entry with the sender gateway ID (F21) coinciding with the gateway ID obtained in Step S1202 to the time obtained in Step S1202 (Step S1203).

The buffer allocation part 1013 allocates the sensor data 3001 stored in the payload of the received packet 2001 to the gateway buffer 1021 of the gateway ID obtained in S1202 (Step S1204).

Through the process described above, in the gateway packet transmission time table 1051, the transmission time of the packet 2001 is stored in the packet transmission time T_transmit (F22) for each gateway 20, and the sensor data 3001 is stored in the gateway buffer 1021 corresponding to the gateway ID.

<Process to Bulk-Register Sensor Data from Gateway Buffer into Database in Sensor Data Management Apparatus>

Figure 9:
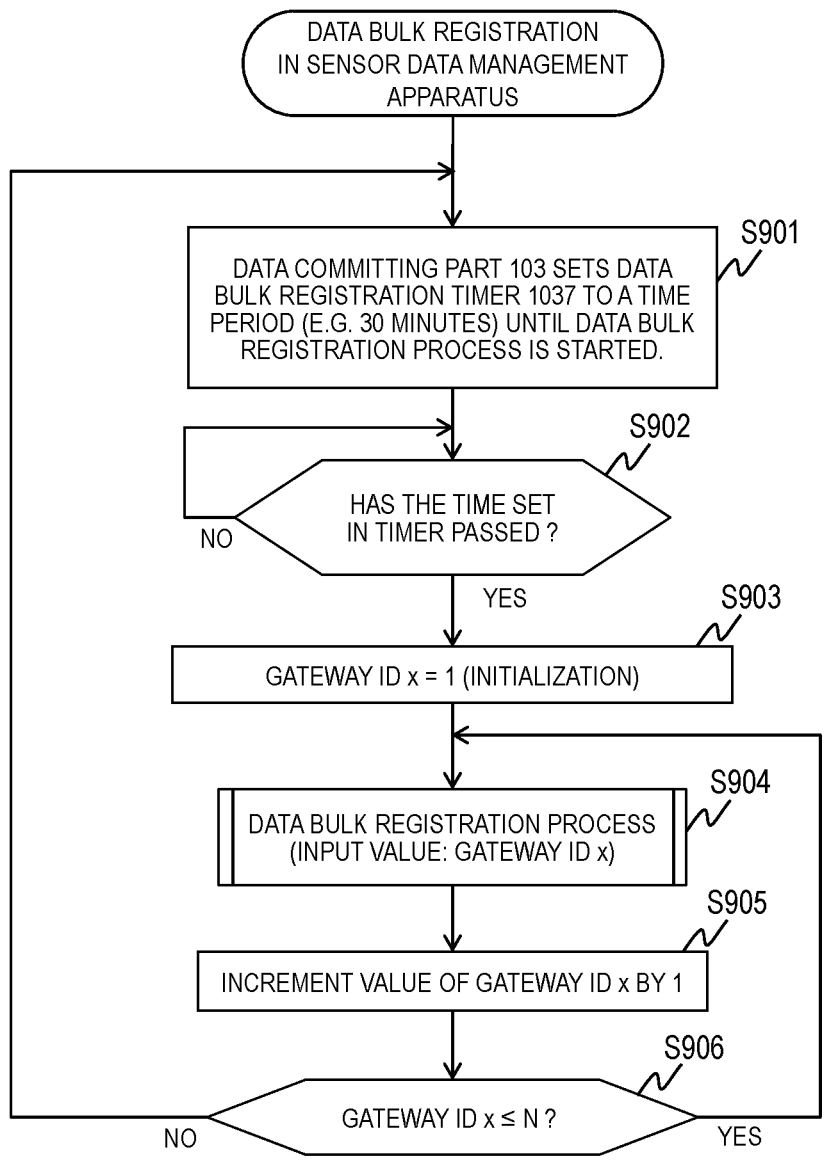
FIG. 9 is a flowchart showing an example of the process for the sensor data management apparatus to register all of the sensor data according to the embodiment of present invention.

FIG. 9 is a flowchart showing an example of the process for the sensor data management apparatus 10 to register all of the sensor data 3001, which is stored in the gateway buffer 1021, together in the second storage part 104 (database). This process is conducted at a time interval of database bulk registration cycle T_database shown in FIG. 6.

The data committing part 103 in the sensor data management apparatus 10 configures the data bulk registration timer 1037 to the time until the data bulk registration process is started (e.g., 30 minutes=T_database) (Step S901). After the configuring is done, the data bulk registration timer starts to count down.

The data committing part 103 checks if the time configured in the data bulk registration timer has passed or not at a certain time interval (Step S902). If the time configured in the data bulk registration timer has not passed (Step S902: NO), the data committing part 103 checks if the time configured in the data bulk registration timer has passed or not again in a certain period of time (Step S902).

If the time configured in the data bulk registration time has passed (Step S902: YES), the data committing part 103 conducts the data bulk registration process on N number of gateway buffers 1021 in an appropriate order. The data committing part 103 uses "x" as a variable to indicate the gateway ID subjected to the data bulk registration process. The data committing part 103 initializes the value "x" at first, so that x equals 1 (Step S903). In Step S903, the data committing part 103 conducts the data bulk registration process on the first gateway buffer 1021-1 first.

The data committing part 103 conducts the data bulk registration process on the gateway buffer 1021-$x$ with the gateway ID=x (Step S904). The data bulk registration process will be described in detail below.

After the data bulk registration process is completed, the data committing part 103 adds 1 to the variable "x" indicating the gateway ID to be subjected to the data bulk registration process (Step S905). The data committing part 103 then determines whether the value "x" exceeds the number (N) of gateway 20 or not (Step S906).

If the value "x" is equal to or smaller than the number N of the gateway 20 (Step S906: YES), the data committing part 103 performs the data bulk registration process on the gateway ID=x (Step S904).

On the other hand, if the value "x" is greater than the number N of gateway 20 (Step S906: NO), this means that the data bulk registration process has been performed on all of the N number of gateway buffers, and therefore, the data committing part 103 configures the data bulk registration timer 1037 to the time until the bulk registration process is started (Step S901), and the processes of Step S902 to S906 will be repeated. The data bulk registration process will be repeated at such a time interval as configured in the data bulk registration timer 1037, and Steps S901 to S906 are repeated until the sensor data management apparatus 10 is stopped.

The value of the time interval (T_database) of the bulk registration process configured in the data bulk registration time 1037 may be a fixed value that is registered in advance in the data committing part 103 in the manufacturing process of the sensor data management apparatus 10, or may be a variable that can be configured by the administrator of the sensor data search system 1 through the input function of the system management server 40. In this embodiment, the time interval of performing the data bulk registration process is the same among all of the gateway buffers 1021, but the data bulk registration timer 1037 may be provided for each of the gateways 20, and the time interval of performing the data bulk registration process may be changed for each of the gateway buffers 1021.

For example, the time interval of the data bulk registration process of the first gateway buffer 1021-1 may be 30 minutes, and the time interval of the data bulk registration process of the second gateway buffer 1021-2 may be 45 minutes. In this case, the configuring value of the data bulk registration timer of the first gateway is 30 minutes, and the setting value of the data bulk registration timer of the first gateway is 45 minutes.

<Data Bulk Registration Process at Data Committing Part>

Figure 10:
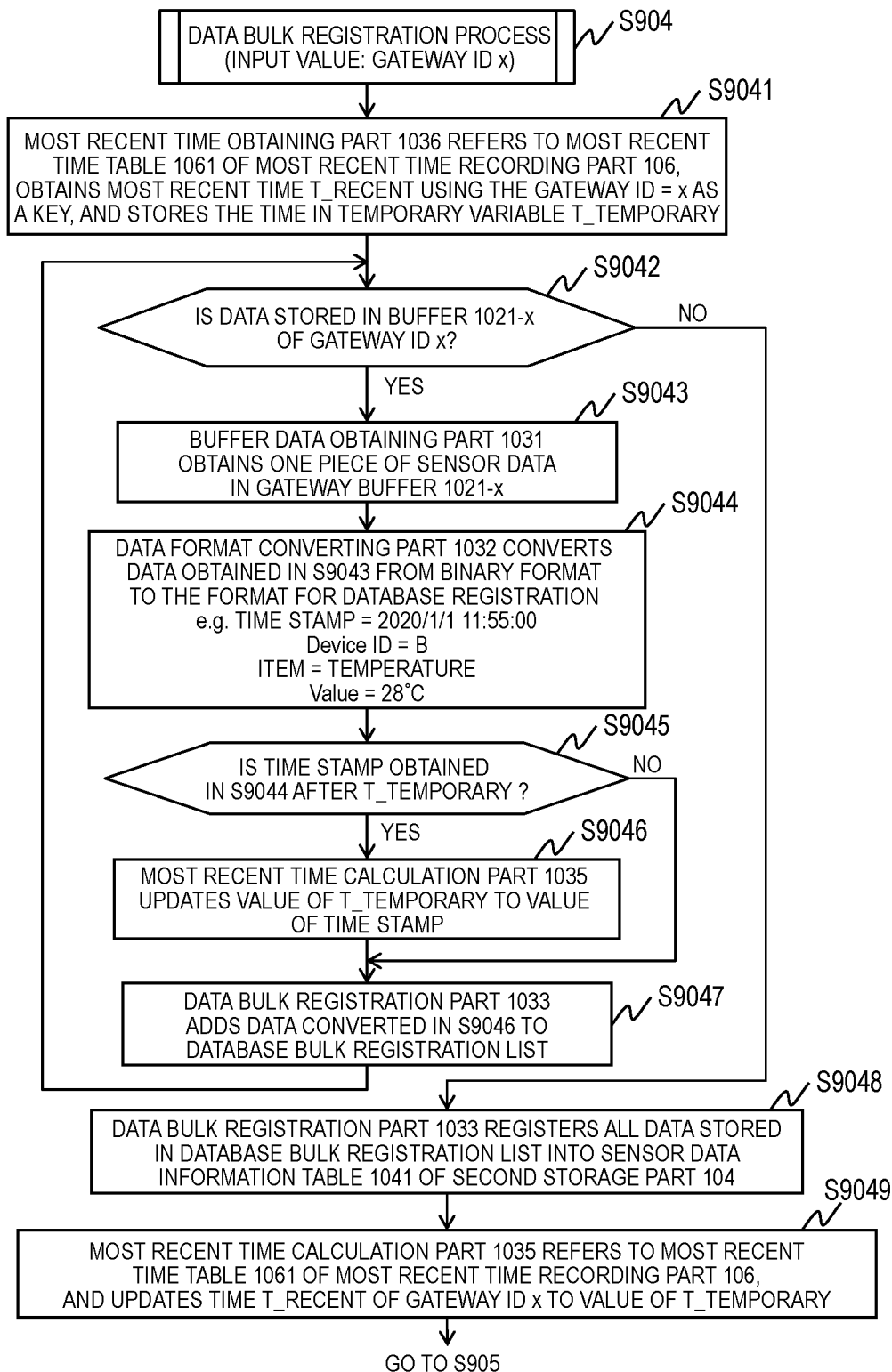
FIG. 10 is a flowchart showing an example of the data bulk registration process in the data committing part according to the embodiment of present invention.

FIG. 10 is a flowchart showing an example of the data bulk registration process in the data committing part 103 shown in Step S904 of FIG. 9. The data committing part 103 enters the gateway ID=x (1≤x≤N) as the input value of the data bulk registration process. This means that the data bulk registration process is performed on the sensor data stored in the x-th gateway buffer 1021-$x$ (1≤x≤N).

First, the most recent time obtaining part 1036 of the data committing part 103 refers to the most recent time table 1061 of the most recent time recording part 106. Then, the most recent time obtaining part 1036 obtains the most recent time T_recent (F32) of the entry including the gateway ID (F31) corresponding to the gateway ID=x. Lastly, the most recent time obtaining part 1036 stores the obtained value of the most recent time T_recent (F32) in the temporary variable T_temporary (Step S9041).

Next, the buffer data obtaining part 1031 obtains the sensor data 3001 from the x-th gateway buffer 1021-$x$. The buffer data obtaining part 1031 determines whether or not the sensor data 3001 is stored in the x-th gateway buffer 1021-$x$ (Step S9042).

If the sensor data is stored (Step S9042: YES), the buffer data obtaining part 1031 obtains one piece of the stored sensor data 3001 (Step S9043).

The buffer data obtaining part 1031 enters the obtained sensor data into the data format converting part 1032, and the data format converting part 1032 coverts the obtained sensor data 3001 from the binary format to the data format required to be stored in the second storage part 104 (database) (Step S9044). For example, the binary string constituting the sensor data 3001 is converted to a text string or value that makes sense to humans such as "time stamp=2020/1/1 11:55:00, Device ID=B, Item=Temperature, Value=28° C."

The data format converting part 1032 enters the sensor data 3001, which was converted to the format to be registered in the second storage part 104 (database), into the time stamp obtaining part 1034, and the time stamp obtaining part 1034 obtains the time stamp from the entered sensor data 3001, and enters the time stamp into the most recent time calculating part management computer. The most recent time calculating part management computer determines whether the entered time stamp is after T_temporary or not (Step S9045).

If the obtained time stamp is after T_temporary (Step S9045: YES), the data format converting part 1032 updates the value of T_temporary to the time of the obtained time stamp (Step S9046). If the obtained time stamp is not after T_temporary (Step S9045: NO), the data format converting part 1032 does not update the value of T_temporary.

The data format converting part 1032 enters the sensor data 3001, which was converted to the format to be registered in the second storage part 104 (database), into the data bulk registration part 1033, and the data bulk registration part 1033 adds the entered sensor data to the database bulk registration list (Step S9047).

As described above, the data committing part 103 repeatedly conducts the processes of Step S9043 to S9047 until the n-th gateway buffer 1021-*x* is empty (Step S9042: NO).

After the n-th gateway buffer 1021-*x* is empty (Step S9042: NO), the data bulk registration part 1033 registers all of the data stored in the database bulk registration list into the sensor data information table 1041 of the second storage part 104 together (Step S9048). The bulk registration into the sensor data information table 1041 may be performed by the data bulk registration part 1033 in the chronological order of the time stamps of the sensor data 3001.

Lastly, the most recent time calculating part management computer refers to the most recent time table 1061 of the most recent time recording part 106, and updates the most recent time T_recent (F32) of the entry including the gateway ID (F31) corresponding to the value of the gateway ID=x to the value of T_temporary (Step S9049), thereby completing the data bulk registration process.

With the above-mentioned process, the sensor data 3001 of each gateway 20 stored in the first storage part 102 is registered into the sensor data information table 1041 of the second storage part 104 in bulk at a prescribed time interval (database bulk registration cycle T_database). The sensor data management apparatus 10 configures the time stamp of the most recent value among the sensor data 3001 to be registered in bulk in the most recent time table 1061 for each gateway 20 as the most recent time (F32).

That is, the sensor data management apparatus 10 uses the gateway packet transmission time table 1051 to manage the recent time of the sensor data 3001 stored in the first storage part 102 (packet transmission time of gateway 20) for each ID of gateway 20, and uses the most recent time (F32) of the most recent time table 1061 to manage the most recent time of the sensor data 3001 registered in the sensor data information table 1041 for each ID of gateway 20.

<Process to Search for Sensor Data Related to Alert Upon Detection of Alert>

Figure 11:
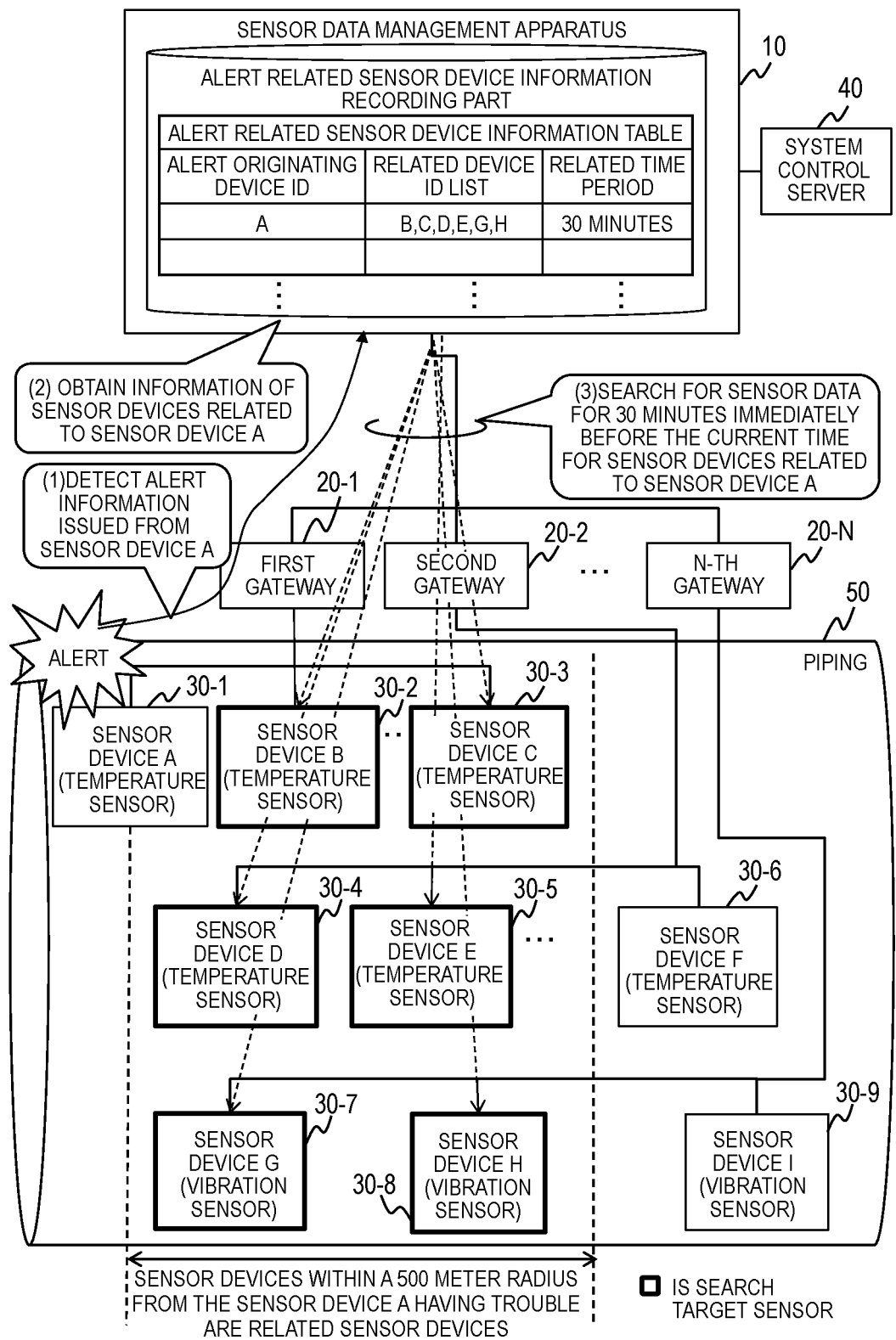
FIG. 11 is a diagram for explaining an example in which the sensor data management apparatus searches for the sensor data according to the embodiment of present invention.

FIG. 11 is a diagram for explaining an example in which the sensor data management apparatus 10 searches for the sensor data 3001 related to an alert upon detection of the alert. FIG. 11 shows an example in which the sensor data management apparatus 10 detects an alert issued by the sensor device A30-1 in the example of the pipe management of FIG. 2.

The sensor data management apparatus 10 that has detected an alert from the sensor device A30-1 refers to the alert related sensor device information table 1091 in the alert related sensor device information storage part 109, and obtains two types of information using A, which is the device ID of the sensor device A30-1 that has issued the alert, as a key. The two types of information are the related sensor device ID list F42 that indicates IDs of sensor devices that send out the sensor data related to the alert of the sensor device A (30-1), and the related time range F43 (search period) that indicates the target time period of the sensor data necessary for analyzing the alert of the sensor device A.

In the example of FIG. 11, the administrator of the sensor data search system 1 defines all sensor devices within a 500 meter radius from the sensor device A as the related sensor devices of the sensor device A, and enters six sensor device IDs of B, C, D, E, G, and H into the related sensor device ID list F42 through the input function of the system management server 40. The related time range is configured by the administrator of the sensor data search system 1 to 30 minutes in advance, and the administrator enters 30 minutes in the relevant time range F43 through the input function of the system management server 40.

The sensor data management apparatus 10 searches for the sensor data of the sensor devices B, C, D, E, G, and H during a time period of 30 minutes prior to the current time based on the information obtained from the alert related sensor device information table 1091, and sends the obtained sensor data 3001 to the system management server 40. The system management server 40 uses the received sensor data 3001 to analyze the reason for the alert. FIG. 11 shows the example related to the sensor device A (30-1), but the same applies to the other sensor devices 30, and by defining neighboring sensor devices 30 to analyze the sensor data 3001 when a problem occurs in the alert related sensor device information table 1091 in advance, it is possible to immediately search for the sensor data 3001 of the neighboring sensor devices of the sensor device 30 that has issued an alert. Also by configuring a time period to obtain the sensor data 3001 in the related time range F43 for each sensor device 30, it is possible to appropriately analyze data depending on the type and characteristics of the sensor device 30.

Figure 12A:
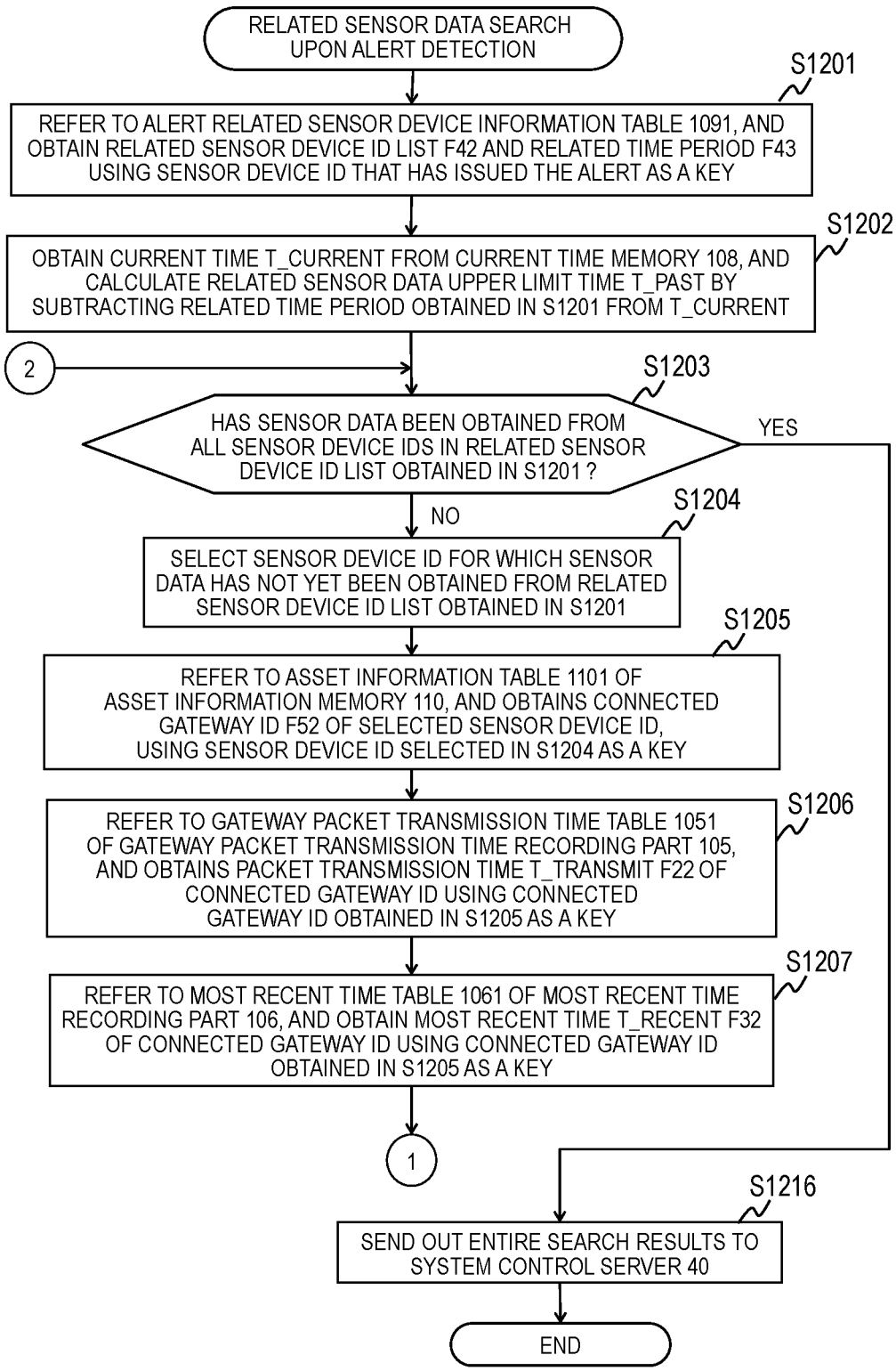
FIG. 12A is a flowcharts showing an example of the first half of process conducted by the search part of the sensor data management apparatus according to the embodiment of present invention.
Figure 12B:
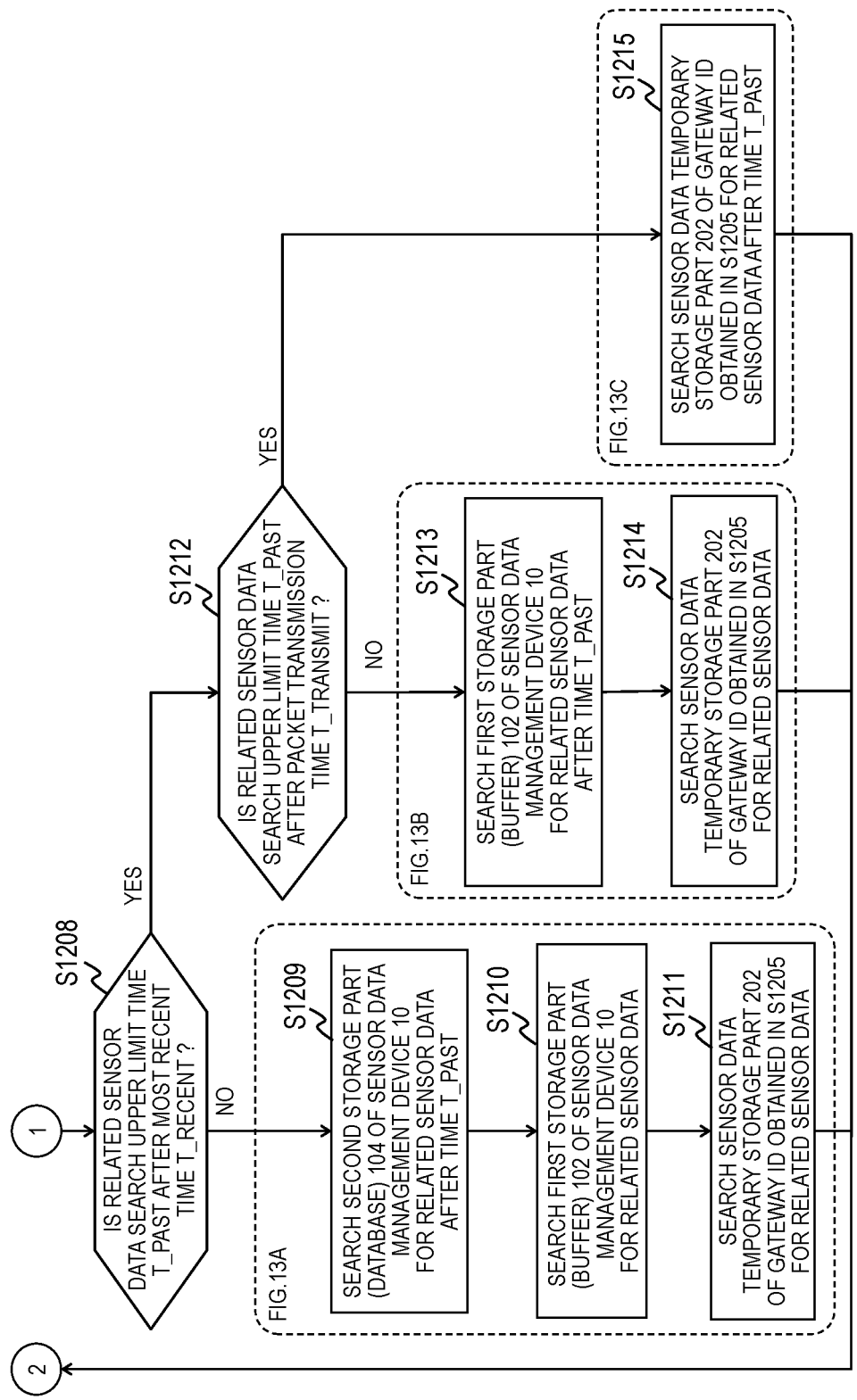
FIG. 12B is a flowcharts showing an example of the second half of process conducted by the search part of the sensor data management apparatus according to the embodiment of present invention.

FIGS. 12A and 12B are flowcharts showing an example of the process conducted by the search part 107 of the sensor data management apparatus 10 to search for related sensor data when an alert issued from the sensor device 30 is detected. First the search part 107 refers to the alert related sensor device information table 1091 in the alert related sensor device information storage part 109, and obtains the related sensor device ID list F42 and the related time range F43, using the sensor device ID of the sender of the alert as a key (Step S1201).

The search part 107 obtains the current time T_current from the current time memory 108 (1081), and calculates a related sensor data search upper limit time T_past by subtracting the related time range, which was obtained in Step S1201, from the current time T_current (Step S1202). The related sensor data search upper limit time T_past indicates the end of the search period going back from the current time T_current.

For example, if the current time T_current is 2020/1/1, 12:00:00, and the related time range obtained in Step S1201 is 30 minutes, the related sensor data search upper limit time T_past is 2020/1/1, 11:30:00, and the 30 minute period from 11:30:00 to 12:00:00 on 2020/1/1 is the search target period of the sensor data 3001.

Next, the search part 107 searches for the sensor data 3001 of the related sensor devices. The search part 107 determines whether the sensor data 3001 has been obtained for all of the sensor device IDs in the related sensor device ID list F42 obtained in Step S1201 or not (Step S1203), and if there is a related sensor device which sensor data has not been obtained (Step S1203: NO), the search part 107 selects the sensor device ID which sensor data has not been obtained from the related sensor device ID list obtained in Step S1201 (Step S1204).

Next, the search part 107 identifies a gateway 20 connected to the selected sensor device 30. Specifically, the search part 107 refers to the asset information table 1101 of the asset information storage part 110, and obtains the connected gateway ID (F52) of the selected sensor device ID using the sensor device ID selected in Step S1204 as a key (Step S1205).

Next, the search part 107 obtains the packet transmission time and the most recent time of the gateway 20 connected to the selected sensor device 30. Specifically, the search part 107 refers to the gateway packet transmission time table 1051 of the gateway packet transmission time recording part 105, and obtains the packet transmission time T_transmit (F22) of the connected gateway 20, using the connected gateway ID obtained in Step S1205 as a key (Step S1206).

Then, the search part 107 refers to the most recent time table 1061 of the most recent time recording part 106, and obtains the most recent time T_recent (F32) of the connected gateway 20, using the connected gateway ID obtained in Step S1205 as a key (Step S1207).

Next, the search part 107 limits the search area (scope) using the related sensor data search upper limit time T_past, the packet transmission time T_transmit of the connected gateway, and the most recent time T_recent of the connected gateway, and searches for the sensor data 3001 of the selected related sensor device ID list (F42).

Specifically, the search part 107 determines whether the related sensor data search upper limit time T_past is after the most recent time T_recent or not (Step S1208).

If the related sensor data search upper limit time T_past is not after the most recent time T_recent (Step S1208: NO), the search part 107 searches the first storage part 102 and the second storage part 104 of the sensor data management apparatus 10, and the sensor data temporary storage part 202 of the gateway 20 connected to the related sensor device, which was selected.

Next, the search part 107 searches the second storage part 104 (sensor data information table 1041) of the sensor data management apparatus 10 for the sensor data 3001 of the related sensor device ID list (F42) after the time T_past (Step S1209), and searches the first storage part 102 of the sensor data management apparatus 10 for the sensor data 3001 of the related sensor device ID list (F42) by selecting the buffer 1021 of the gateway ID obtained in Step S1205 (Step S1210). The search part 107 also searches the sensor data temporary storage part 202 of the gateway ID obtained in Step S1205 for the sensor data 3001 of the related sensor device ID list (F42) (Step S1211). The search target of Steps S1209 to S1211 corresponds to FIG. 13A described below.

If the related sensor data search upper limit time T_past is after the most recent time T_recent (Step S1208: YES), the search part 107 determines whether the related sensor data search upper limit time T_past is after the packet transmission time T_transmit of the connected gateway or not (Step S1212).

If the related sensor data search upper limit time T_past is not after the packet transmission time T_transmit of the connected gateway (Step S1212: NO), the search part 107 searches the first storage part 102 of the sensor data management apparatus 10, and the sensor data temporary storage part 202 of the gateway 20 connected to the sensor device 30 of the related sensor device ID list (F42), which was selected.

The search part 107 searches the first storage part 102 of the sensor data management apparatus 10 for the sensor data 3001 of the related sensor device ID list (F42) after the time T_past from the buffer 1021 corresponding to the gateway ID obtained in Step S1205 (Step S1213), and searches the sensor data temporary part 202 of the gateway ID obtained in Step S1205 for the related sensor data (Step S1214). The search target of Steps S1213 to S1214 corresponds to FIG. 13B described below.

If the related sensor data search upper limit time T_past is after the packet transmission time T_transmit of the connected gateway (Step S1212: YES), only the sensor data temporary storage part 202 of the gateway 20 connected to the selected sensor device 30 of the related sensor device ID list (F42) is to be searched, and the search part 107 searches the sensor data temporary storage part 202 of the gateway ID obtained in Step S1205 for the sensor data 3001 of the related sensor device ID list (F42) after the time T_past (Step S1215). The search target of Step S1215 corresponds to FIG. 13C described below.

The sensor data search for the selected related sensor devices is completed as follows. After the sensor data search is completed for all of the related sensor devices (Step S1203: YES), the search part 107 sends the sensor data, which was found in the search, to the system management server 40 (Step S1216).

Figure 13A:
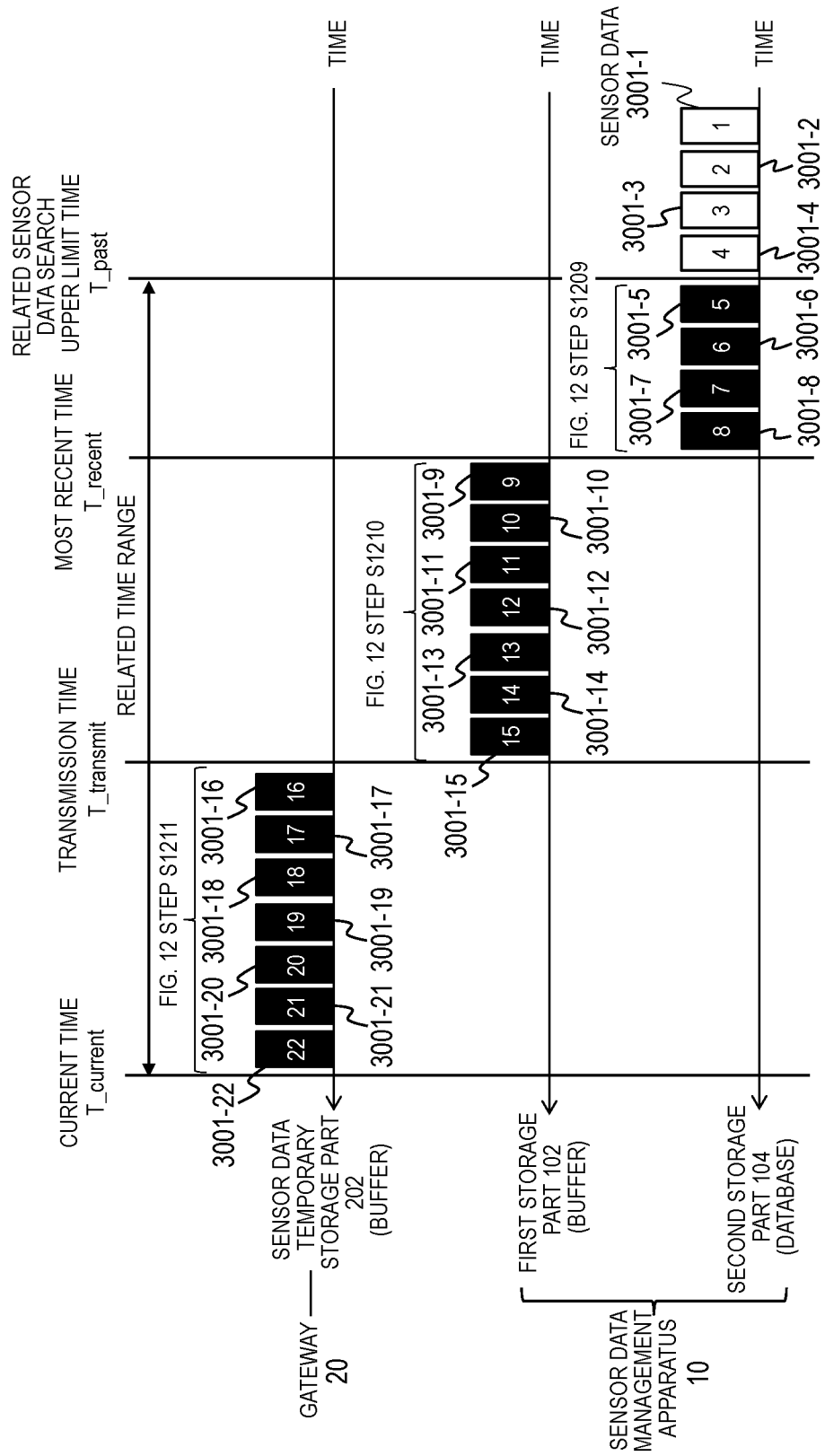
FIG. 13A is a diagram for explaining the patterns of the areas to be searched according to the embodiment of present invention.
Figure 13B:
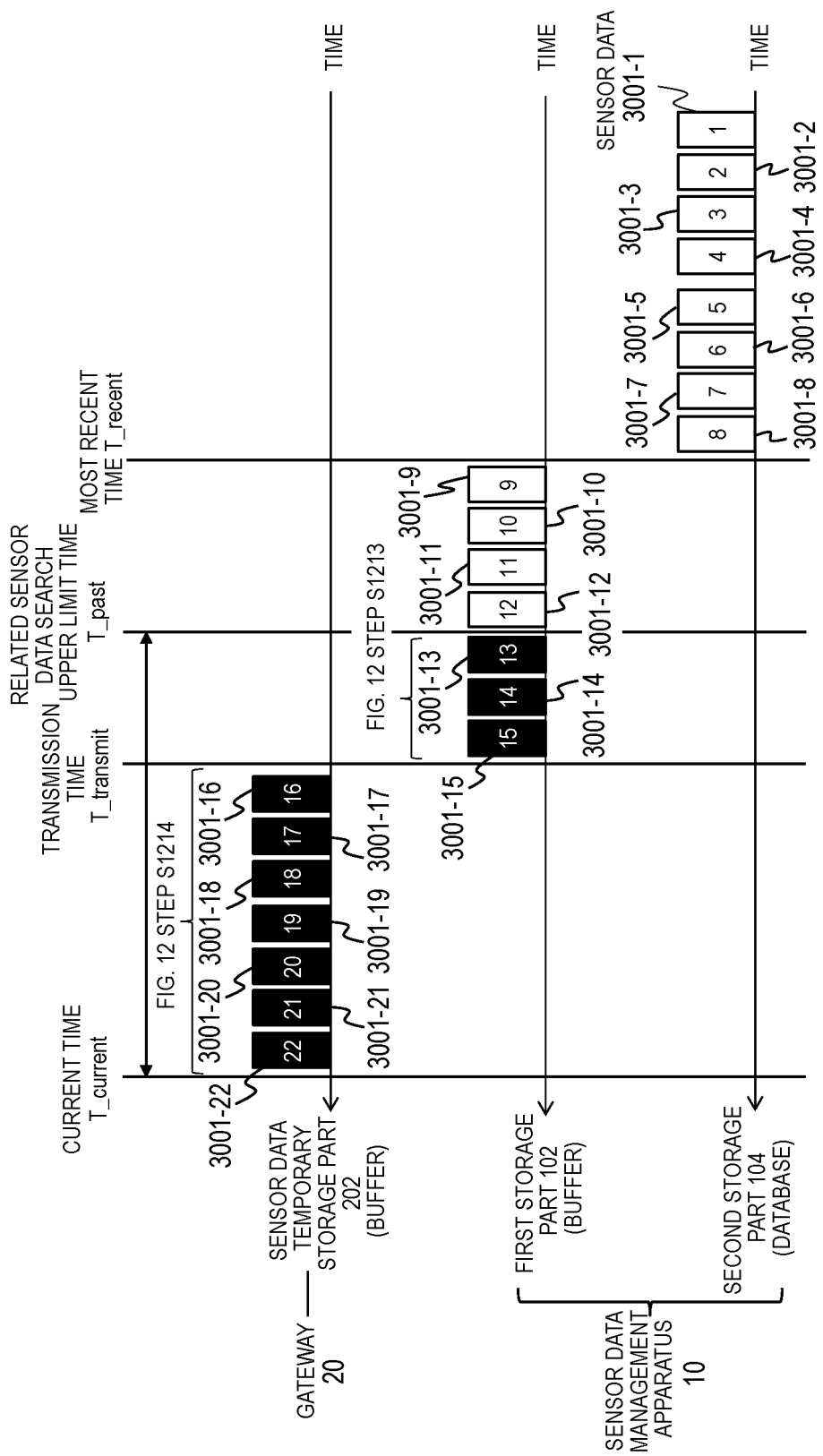
FIG. 13B is a diagram for explaining the patterns of the areas to be searched according to the embodiment of present invention.
Figure 13C:
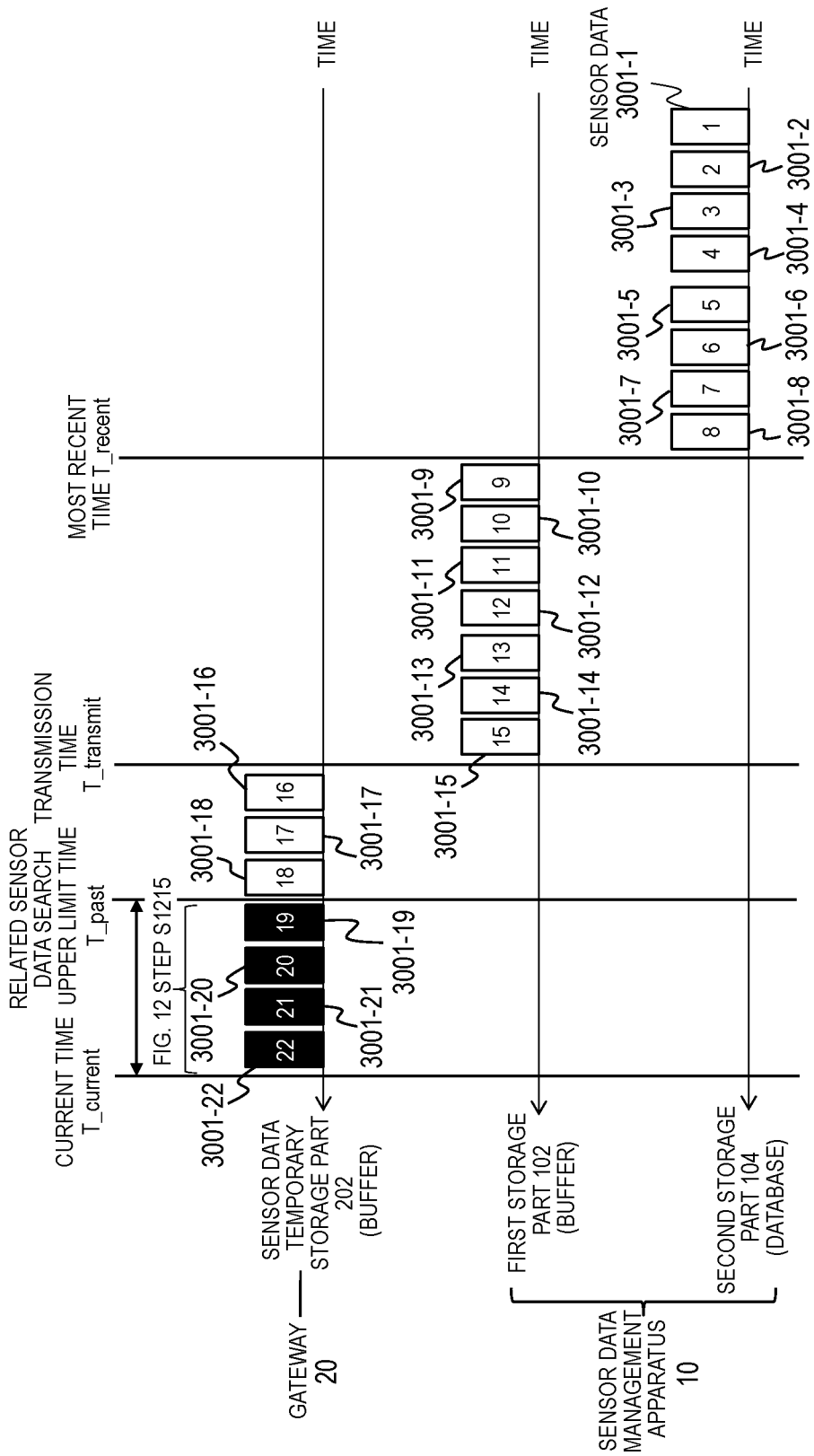
FIG. 13C is a diagram for explaining another patterns of area to be searched according to the embodiment of present invention.

FIGS. 13A to 13C are diagrams for explaining the patterns of the areas to be searched in the present invention. In FIG. 13A to 13C, the sensor data 3001-1 to 3001-8 is stored in the second storage part 104 (sensor data information table 1041) of the sensor data management apparatus 10, the sensor data 3001-9 to 3001-15 is stored in the first storage part 102 of the sensor data management apparatus 10 (buffer 1021), and the sensor data 3001-16 to 3001-22 is stored in the sensor data temporary storage part 202 of the gateway 20.

The sensor data 3001-1 to 3001-22 in the diagrams is arranged in a chronological order, where the sensor data 3001-1 is the oldest sensor data, and the sensor data 3001-22 is the latest sensor data.

As described in the flowchart of FIG. 12B, there are three patterns of the areas to be searched, which are determined based on the related sensor data search upper limit time T_past, the packet transmission time T_transmit of the connected gateway, and the most recent time T_recent of the connected gateway. FIG. 13A shows an example in which the related sensor data search upper limit time T_past is not after the most recent time T_recent (Step S1208 of the flowchart of FIG. 12B: NO).

In FIG. 13A, the first storage part 102 and the second storage part 104 of the sensor data management apparatus 10 and the sensor data temporary storage part 202 of the gateway 20 connected to the selected related sensor device are to be searched (Steps S1209, S1210, and S1211 of the flowchart of FIG. 12B), and the sensor data 3001-5 to 3001-22 is the search target.

FIG. 13B shows an example in which the related sensor data search upper limit time T_past is after the most recent time T_recent (Step S1208 of the flowchart of FIG. 12B: YES), and the related sensor data search upper limit time T_past is not after the packet transmission time T_transmit of the connected gateway (Step S1212 of the flowchart of FIG. 12B: NO).

In FIG. 13B, the first storage part 102 of the sensor data management apparatus 10 and the sensor data temporary storage part 202 of the gateway 20 connected to the selected related sensor device are to be searched (Steps S1213 and S1214 of the flowchart of FIG. 12B), and the sensor data 3001-13 to 3001-22 is the search target.

FIG. 13C shows an example in which the related sensor data search upper limit time T_past is after the packet transmission time T_transmit of the connected gateway (Step S1212 of the flowchart of FIG. 12B: YES). The sensor data temporary storage part 202 of the gateway 20 connected to the selected related sensor device is to be searched (Step S1215 of the flowchart of FIG. 12B), and the sensor data 3001-19 to 3001-22 is the search target.

Figure 14A:
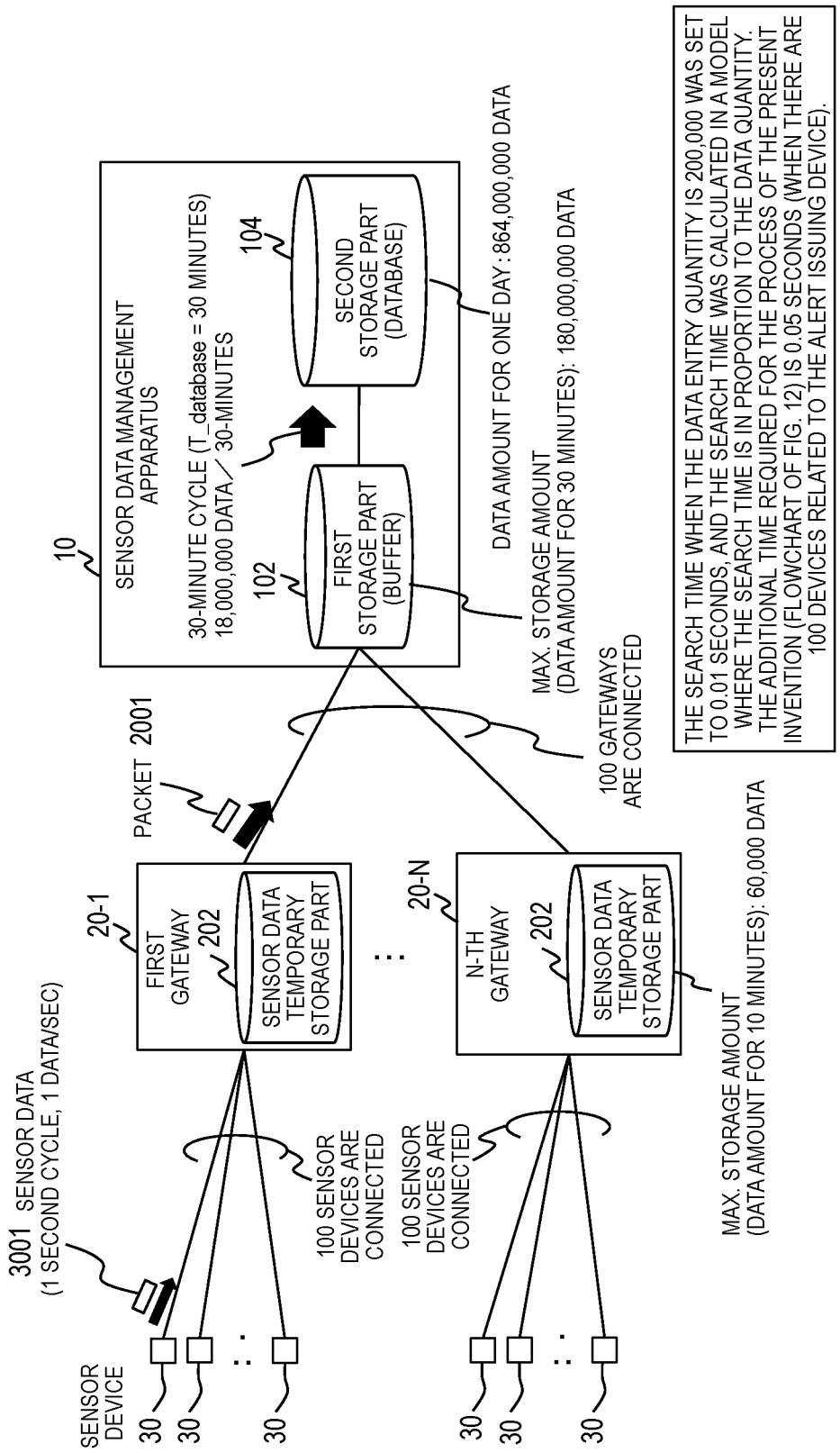
FIG. 14A is a diagram showing an example of the effects according to the embodiment of present invention.
Figure 14B:
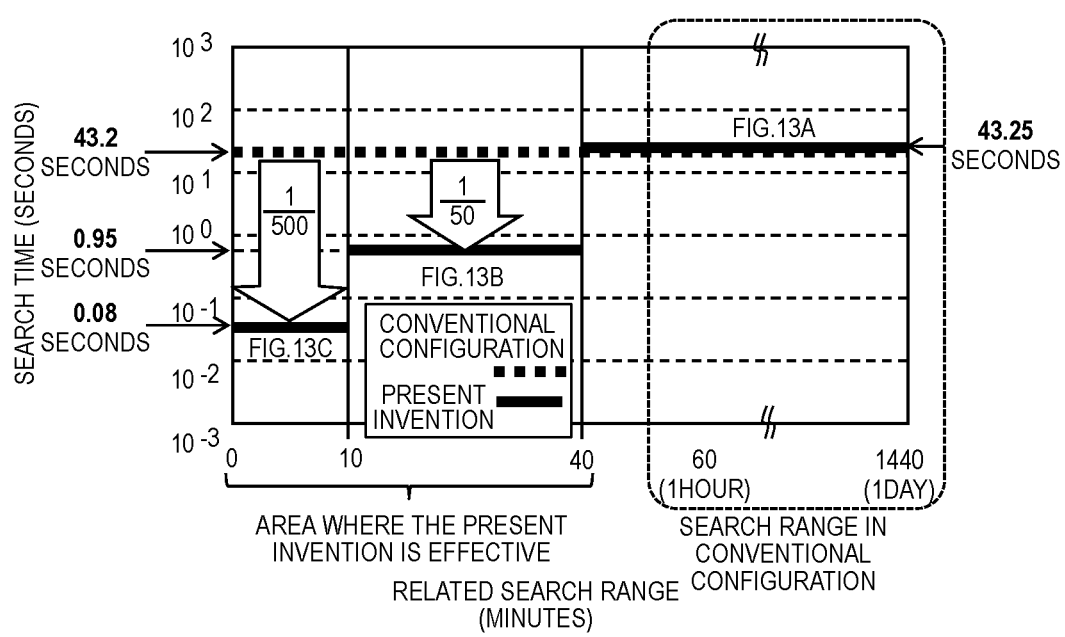
FIG. 14B is a diagram showing an example of the effects according to the embodiment of present invention.

FIGS. 14A and 14B are diagrams showing an example of the effects of the invention. FIG. 14A shows the conditions defined to illustrate the effects. 100 of gateways 20 are connected to the sensor data management apparatus 10, and 100 of sensor devices 30 are connected to each gateway 20.

Each sensor device 30 sends out sensor data 3001 every second. Each gateway 20 sends out a packet 2001 every 10 minutes. The sensor data management apparatus 10 performs bulk registration of the sensor data from the first storage part 102 to the second storage part 104 every 30 minutes. The related device number of the alert issuing device (the number of sensors in the related sensor device ID list F42) is 100.

FIG. 14B is a graph that evaluates the sensor data search time of the conventional configuration and the present invention under the conditions of FIG. 14A. The search time when the data entry quantity is 200,000 was configured to 0.01 seconds, and the search time was calculated in a model where the search time is in proportion to the data entry quantity.

The time required for the process of the present invention (the flowchart of FIGS. 12A and 12B) is 0.05 seconds when there are 100 devices related to the alert originating device. The present invention is effective when the sensor data is to be searched for up to forty minutes immediately before the current time, and as compared with the conventional configuration, the search time can be reduced up to 1/500.

As described above, the sensor data management apparatus 10 manages the most recent time T_recent, which is the latest time stamp among the time stamps of the sensor data 3001 subjected to the bulk registration, for each gateway 20, as well as the transmission time T_transmit of the last packet sent by the gateway 20 and the current time T_current.

The search part 107 of the sensor data management apparatus 10 calculates the related sensor data search upper limit time T_past that determines the search target, and narrows down the areas to be searched (memory area) by comparing the related sensor data search upper limit time T_past with the T_recent and T_transmit. In particular, by comparing T_transmit with T_past (S1212), it is possible to determine whether the search target can be narrowed down only to the gateway 20 or not.

This way, the area (scope) of the memory to be searched for the sensor data 3001 can be kept to the minimum necessity, which speeds up the search process of the sensor data management apparatus 10 that handles a large amount of data.

The sensor data management apparatus 10 has the related sensor device ID list F42 that indicates sensor devices 30 to be analyzed when an alert from the sensor device 30 is detected, and therefore, it is possible to automatically decide the sensor data 3001 to be collected upon detection of an alert such as abnormality. As a result, an abnormal situation or failure can be immediately handled.

In the embodiment described above, the sensor device 30 was configured to send out one piece of sensor data 3001 at a time interval of the prescribed cycle T_A, but it is also possible that the sensor device 30 sends out a plurality of pieces of sensor data 3001 at a time interval of the prescribed cycle T_A.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A sensor data search system for searching sensor data, comprising:
   a gateway connected to a plurality of sensor devices; and
   a management computer including a processor and a memory, the management computer being connected to a plurality of the gateways,
   wherein the gateway collects sensor data from the sensor devices and stores the sensor data in a temporary storage part, the sensor data including a measurement value, a time stamp, and an identifier,
   wherein the management computer includes:
   a receiving part that collects the sensor data of each gateway, stores the sensor data in a first storage part, and updates a first time, which is a time at which the sensor data was collected, for each gateway;
   a data committing part that registers the sensor data of the first storage part into a second storage part at a prescribed time interval of registration cycle, compares time stamps of the registered sensor data among the respective gateways, and updates a second time to a value of the latest time stamp for each gateway; and
   a search part that receives a search period, and searches for sensor data including time stamps within the search period, and
   wherein the search part calculates a search upper limit time by taking the search period and subtracting the search period from the current time, and compares the second time with the search upper limit time.

2. The sensor data search system according to claim 1, wherein the search part compares the first time or the second time with the search upper limit time, thereby narrowing down a scope of data storage parts to be searched from the temporary storage part, the first storage part, and the second storage part.

3. The sensor data search system according to claim 1,
   wherein, at a prescribed time interval of transmission cycle, the gateway adds a transmission time to sensor data stored in the temporary storage part, and sends the sensor data to the management computer, and
   wherein the receiving part updates the first time to the transmission time for each gateway.

4. The sensor data search system according to claim 1,
   wherein the first storage part has a memory area to store sensor data for each gateway, and
   wherein the data committing part obtains sensor data from each memory area of the first storage part at a time interval of registration cycle, and registers all of the sensor data together into the second storage part in a chronological order of the time stamp.

5. The sensor data search system according to claim 1, wherein the sensor device outputs an alert indicating an abnormal state, the alert including an identifier of the sensor device,
wherein the management computer has alert related information including identifiers of search target sensor devices related to the identifier of the sensor device that has issued the alert, and a search period, the identifiers of search target and the search period being configured in advance, and
wherein, when receiving the alert, the search part obtains identifiers of search target sensor devices corresponding to the identifier of the sensor device that has issued the alert and the search period from the alert related information, and searches for sensor data of the search target sensor devices based on the search period.

6. The sensor data search system according to claim 1, wherein the management computer includes asset information in which a connection relationship between the sensor devices and the gateways is configured in advance, and
wherein the search part refers to the asset information based on an identifier of the sensor device, and identifies a gateway connected to the sensor device.

7. A sensor data search method for searching sensor data, comprising:
a first step in which a gateway connected to a plurality of sensor devices collects sensor data including a measurement value and a time stamp from each of the sensor devices, and stores the sensor data in a temporary storage part;
a second step in which a management computer including a processor and a memory and being connected to a plurality of the gateways collects the sensor data for each gateway and stores the sensor data in a first storage part, and updates a first time to the time at which the sensor data was collected for each gateway;
a third step in which the management computer registers the sensor data of the first storage part into a second storage part at a prescribed time interval of registration cycle, compares time stamps of the registered sensor data among the respective gateways, and updates a second time to a value of the latest time stamp for each gateway; and
a fourth step in which the management computer receives a search period, and searches for sensor data including time stamps within the search period,
wherein, in the fourth step, a search upper limit time is calculated by taking the search period and subtracting the search period from the current time, and the second time is compared with the search upper limit time.

8. The sensor data search method according to claim 7, wherein, in the fourth step, the first time or the second time is compared with the search upper limit time, thereby narrowing down a data storage part to be searched from the temporary storage part, the first storage part, and the second storage part.

9. The sensor data search method according to claim 7, wherein, in the first step, at a prescribed time interval of transmission cycle, the gateway adds a transmission time to the sensor data stored in the temporary storage part, and sends the sensor data to the management computer, and wherein, in the second step, the management computer updates the first time to the transmission time for each gateway.

10. The sensor data search method according to claim 7, wherein the first storage part has a memory area to store sensor data for each gateway, and
wherein, in the third step, sensor data from each memory area of the first storage part is obtained at a time interval of registration cycle, and registered the sensor data in bulk into the second storage part in a chronological order of the time stamp.

11. The sensor data search method according to claim 7, further comprising a step in which a sensor device outputs an alert indicating an abnormal state, the alert including an identifier of the sensor device,
wherein, in the fourth step, the management computer that has received the alert refers to alert related information in which identifiers of search target sensor devices related to the identifier of the sensor device that has issued the alert and a search period are configured in advance, obtains identifiers of search target sensor devices corresponding to the identifier of the sensor device that has issued the alert and the search period from the alert related information, and searches for sensor data of the search target sensor devices based on the search period.

12. The sensor data search method according to claim 7, wherein, in the fourth step, the management computer refers to asset information in which a connection relationship between the sensor devices and the gateways is configured in advance, and identifies the gateway corresponding to the identifier of the sensor device.

13. A management computer, comprising:
a processor; and
a memory,
wherein the management computer is connected to a plurality of gateways, and is configured to search for sensor data including a measurement value, a time stamp, and an identifier of a sensor device,
wherein the management computer further comprises:
a receiving part that collects the sensor data of each gateway, stores the sensor data in a first storage part, and updates a first time, which is a time at which the sensor data was collected, for each gateway;
a data committing part that registers the sensor data of the first storage part into a second storage part at a prescribed time interval of registration cycle, compares time stamps of the registered sensor data among the respective gateways, and updates a second time to a value of the latest time stamp for each gateway; and
a search part that receives a search period, and searches for sensor data including time stamps within the search period, and
wherein the search part calculates a search upper limit time by taking the search period and subtracting the search period from the current time, and compares the second time with the search upper limit time.

14. The management computer according to claim 13, wherein the search part compares the first time or the second time with the search upper limit time, thereby narrowing down a data storage part to be searched from the first storage part and the second storage part.

15. The management computer according to claim 13, wherein, at a prescribed time interval of transmission cycle, the receiving part receives a sensor data including a transmission time, and updates the first time to the transmission time for each gateway.

\* \* \* \* \*